(12) United States Patent
Xu et al.

(10) Patent No.: US 11,985,287 B2
(45) Date of Patent: May 14, 2024

(54) IMAGE PROCESSING METHOD, IMAGE PROCESSING DEVICE, ELECTRONIC APPARATUS AND STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 443 days.

(21) Appl. No.: 17/405,040

(22) Filed: Aug. 18, 2021

(65) Prior Publication Data
US 2022/0060602 A1    Feb. 24, 2022

(30) Foreign Application Priority Data
Aug. 21, 2020    (CN) .......................... 202010851952.X

(51) Int. Cl.
*G06T 7/11*        (2017.01)
*G06T 3/4038*     (2024.01)
*H04N 1/40*        (2006.01)

(52) U.S. Cl.
CPC ....... *H04N 1/40012* (2013.01); *G06T 3/4038* (2013.01); *G06T 7/11* (2017.01);
(Continued)

(58) Field of Classification Search
CPC .................... G06T 3/4038; G06T 7/11; G06T 2207/20021; G06T 2207/30176;
(Continued)

(56) References Cited

U.S. PATENT DOCUMENTS

2007/0154112 A1   7/2007   Tanaka
2015/0055887 A1   2/2015   Hasegawa
(Continued)

FOREIGN PATENT DOCUMENTS

| CA | 3110126 | 2/2020 |
|---|---|---|
| CN | 102831397 | 12/2012 |

(Continued)

OTHER PUBLICATIONS

Tang, Liusheng, "Research on Image Processing Technology of Pathological Section Digital Scanning Equipment", South China University of Technology a Dissertation Submitted for the Degree of Master, with English abstract, Apr. 2019, pp. 1-123.
(Continued)

*Primary Examiner* — Marcos L Torres
(74) *Attorney, Agent, or Firm* — JCIP GLOBAL INC.

(57) ABSTRACT

An image processing method, an image processing device, an electronic apparatus, and a non-transitory computer-readable storage medium are provided. The image processing method includes: obtaining an original image; performing slicing processing on the original image to obtain multiple slice images of the original image; respectively processing the slice images through a first binarization model to obtain multiple slice binary images respectively corresponding to the slice images; performing stitching processing on the slice binary images to obtain a first binary image; processing the first binary image to obtain a pixel circumscribed contour image; processing the original image through a second binarization model to obtain a second binary image; synthesizing the second binary image and the first binary image according to positions of multiple circumscribed contour pixels in the pixel circumscribed contour image to obtain a synthetic image.

20 Claims, 19 Drawing Sheets

(52) U.S. Cl.
CPC ............... *G06T 2207/20021* (2013.01); *G06T 2207/30176* (2013.01)

(58) Field of Classification Search
CPC . G06T 2207/20084; G06T 7/136; G06T 5/50; G06T 2207/20081; H04N 1/40012; G06V 10/28; G06V 10/44; G06V 30/00
See application file for complete search history.

(56) References Cited

U.S. PATENT DOCUMENTS

| | | | |
|---|---|---|---|
| 2015/0181077 A1 | 6/2015 | Misawa et al. | |
| 2019/0130151 A1 | 5/2019 | Lee et al. | |
| 2019/0266706 A1* | 8/2019 | Mondal | G06T 7/136 |
| 2020/0028826 A1* | 1/2020 | Li | G06T 7/136 |
| 2020/0034972 A1 | 1/2020 | Xu et al. | |
| 2023/0326035 A1* | 10/2023 | Li | G06T 7/12 |
| | | | 382/173 |

FOREIGN PATENT DOCUMENTS

| | | |
|---|---|---|
| CN | 105761271 | 7/2016 |
| CN | 106570484 | 4/2017 |
| CN | 107103321 | 8/2017 |
| CN | 107563977 | 1/2018 |
| CN | 107991309 | 5/2018 |
| CN | 108416732 | 8/2018 |
| CN | 109357630 | 2/2019 |
| CN | 109409262 | 3/2019 |
| CN | 109410215 | 3/2019 |
| CN | 109697722 | 4/2019 |
| CN | 109741394 | 5/2019 |
| CN | 109844809 | 6/2019 |
| CN | 109903270 | 6/2019 |
| CN | 109903321 | 6/2019 |
| CN | 109978810 | 7/2019 |
| CN | 110427946 | 11/2019 |
| CN | 111028137 | 4/2020 |
| CN | 111275696 | 6/2020 |
| CN | 111488881 | 8/2020 |
| JP | 2011101270 | 5/2011 |
| JP | 2016054564 | 4/2016 |
| JP | 2019109710 | 7/2019 |
| WO | 2014174553 | 10/2014 |

OTHER PUBLICATIONS

Yulei Qin et al., "Pulmonary nodule segmentation with CT sample synthesis using adversarial networks", Medical physics, Mar. 2019, pp. 1218-1229, vol. 46, No. 3.

"Office Action of China Counterpart Application", issued on Dec. 29, 2023, p. 1-p. 9.

"Notice of allowance of China Counterpart Application", issued on Jan. 22, 2024, p. 1-p. 2.

* cited by examiner

IMAGE PROCESSING METHOD, IMAGE PROCESSING DEVICE, ELECTRONIC APPARATUS AND STORAGE MEDIUM

CROSS-REFERENCE TO RELATED APPLICATION

This application claims the priority benefit of China application serial no. 202010851952.X, filed on Aug. 21, 2020. The entirety of the above-mentioned patent application is hereby incorporated by reference herein and made a part of this specification.

BACKGROUND

Technical Field

The disclosure relates to an image processing method, an image processing device, an electronic apparatus, and a non-transitory computer-readable storage medium.

Description of Related Art

In digital image processing, image binarization processing is to set the grayscale value of a pixel point on an image to 0 or 255. Performing image binarization processing on the image may greatly reduce the amount of data in the image, thereby highlighting the contour of the target of interest. In addition, image binarization processing also facilitates the processing and analysis of the image, for example, the extraction of information in the image.

SUMMARY

At least one embodiment of the disclosure provides an image processing method, which includes the following steps. An original image is obtained. The original image includes at least one object. Slicing processing is performed on the original image to obtain multiple slice images of the original image. The slice images are respectively processed through a first binarization model to obtain multiple slice binary images respectively corresponding to the slice images. Stitching processing is performed on the slice binary images to obtain a first binary image. The first binary image is processed to obtain a pixel circumscribed contour image. The pixel circumscribed contour image includes multiple circumscribed contour pixels. Pixels in a region surrounded by the circumscribed contour pixels are pixels corresponding to at least a part of the at least one object. The original image is processed through a second binarization model to obtain a second binary image. The second binary image and the first binary image are synthesized according to positions of the circumscribed contour pixels in the pixel circumscribed contour image to obtain a synthetic image. The synthetic image is a binary image.

For example, in the image processing method according to at least one embodiment of the disclosure, performing slicing processing on the original image to obtain the slice images of the original image includes the following steps. A first slice size and an extension slice size are determined. A second slice size is determined according to the first slice size and the extension slice size. A number of slices is determined according to a size of the original image and the second slice size. Slicing processing is performed on the original image according to the extension slice size, the second slice size, and the number of slices to obtain the slice images of the original image. A number of slice images is equal to the number of slices. A size of each slice image in the slice images is the first slice size.

For example, in the image processing method according to at least one embodiment of the disclosure, performing slicing processing on the original image according to the extension slice size, the second slice size, and the number of slices to obtain the slice images of the original image includes the following steps. An original image to be sliced is determined based on the original image according to the second slice size and the number of slices. Slicing processing is performed on the original image to be sliced based on the second slice size and the extension slice size to obtain the slice images.

For example, in the image processing method according to at least one embodiment of the disclosure, performing slicing processing on the original image to be sliced based on the second slice size and the extension slice size to obtain the slice images includes the following steps. The original image to be sliced is divided into multiple subregions according to the second slice size. A number of the subregions is equal to the number of slices. Slicing processing is performed on the original image to be sliced according to the extension slice size and the subregions to obtain the slice images. The slice images correspond to the subregions one-to-one. Each slice image in the slice images includes a corresponding subregion in the subregions.

For example, in the image processing method according to at least one embodiment of the disclosure, the original image includes four fixed edges. Each subregion in the subregions includes four region edges. Performing slicing processing on the original image to be sliced according to the extension slice size and the subregions to obtain the slice images includes the following steps. In response to all four region edges corresponding to an i-th subregion in the subregions not overlapping with the four fixed edges, the four region edges corresponding to the i-th subregion are respectively extended by the extension slice size in a direction away from the i-th subregion with the i-th subregion as a center to obtain a slice position corresponding to a slice image corresponding to the i-th subregion. The original image to be sliced is sliced according to the slice position to obtain the slice image corresponding to the i-th subregion. Alternatively, in response to one region edge in four region edges corresponding to an i-th subregion in the subregions overlapping with one fixed edge in the four fixed edges, a region edge opposite to the one region edge in the four region edges is extended by twice the extension slice size in a direction away from the i-th subregion, and region edges adjacent to the one region edge in the four region edges are respectively extended by the extension slice size in the direction away from the i-th subregion to obtain a slice position corresponding to a slice image corresponding to the i-th subregion. The original image to be sliced is sliced according to the slice position to obtain the slice image corresponding to the i-th subregion. Alternatively, in response to two region edges in four region edges corresponding to an i-th subregion in the subregions overlapping with two fixed edges in the four fixed edges, other region edges other than the two region edges in the four region edges are extended by twice the extension slice size in a direction away from the i-th subregion to obtain a slice position corresponding to a slice image corresponding to the i-th subregion. The original image to be sliced is sliced according to the slice position to obtain the slice image corresponding to the i-th subregion, where i is a positive integer and is less than or equal to the number of the subregions.

For example, in the image processing method according to at least one embodiment of the disclosure, a size of each slice binary image in the slice binary images is the first slice size. Performing stitching processing on the slice binary images to obtain the first binary image includes the following steps. A positional relationship of the slice binary images is determined according to a positional relationship of the subregions in the original image to be sliced. Stitching processing is performed on the slice binary images based on the positional relationship of the slice binary images to obtain a binary prediction image. In response to a size of the binary prediction image being not equal to the size of the original image, size restoration processing is performed on the binary prediction image to obtain the first binary image. In response to the size of the binary prediction image being equal to the size of the original image, the binary prediction image is used as the first binary image. The size of the first binary image is the same as the size of the original image.

For example, in the image processing method according to at least one embodiment of the disclosure, all pixels in the first binary image are arranged in n rows and m columns. Performing stitching processing on the slice binary images based on the positional relationship of the slice binary images to obtain the binary prediction image includes the following steps. Performing stitching processing on the slice binary images based on the positional relationship of the slice binary images to obtain an intermediate binary prediction image. All pixels in the intermediate binary prediction image are arranged in n rows and m columns. In response to a t1-th row and a t2-th column in the intermediate binary prediction image including only one pixel, a grayscale value of the one pixel located in the t1-th row and the t2-th column is used as a grayscale value of a pixel in a t1-th row and a t2-th column in the binary prediction image. In response to the t1-th row and the t2-th column in the intermediate binary prediction image including multiple pixels, OR operation is performed on grayscale values of the pixels located in the t1-th row and the t2-th column to obtain grayscale values of pixels in the t1-th row and the t2-th column in the binary prediction image, where n, m, t1, and t2 are all positive integers, t1 is less than or equal to n, and t2 is less than or equal to m.

For example, in the image processing method according to at least one embodiment of the disclosure, performing slicing processing on the original image to obtain the slice images of the original image includes the following steps. The second slice size is determined. The number of slices is determined according to the size of the original image and the second slice size. Slicing processing is performed on the original image according to the second slice size and the number of slices to obtain the slice images of the original image. The number of slice images is equal to the number of slices. The size of each slice image in the slice images is the second slice size.

For example, in the image processing method according to at least one embodiment of the disclosure, performing slicing processing on the original image according to the second slice size and the number of slices to obtain the slice images of the original image includes the following steps. The original image to be sliced is determined based on the original image according to the second slice size and the number of slices. Slicing processing is performed on the original image to be sliced based on the second slice size to obtain the slice images.

For example, in the image processing method according to at least one embodiment of the disclosure, the size of each slice binary image in the slice binary images is the second slice size. Performing stitching processing on the slice binary images to obtain the first binary image includes the following steps. The positional relationship of the slice binary images is determined according to the positional relationship of the slice images in the original image to be sliced. Stitching processing is performed on the slice binary images based on the positional relationship of the slice binary images to obtain the binary prediction image. In response to the size of the binary prediction image being not equal to the size of the original image, size restoration processing is performed on the binary prediction image to obtain the first binary image. In response to the size of the binary prediction image being equal to the size of the original image, the binary prediction image is used as the first binary image. The size of the first binary image is the same as the size of the original image.

For example, in the image processing method according to at least one embodiment of the disclosure, determining the original image to be sliced based on the original image according to the second slice size and the number of slices includes the following steps. A size to be sliced is determined according to the second slice size and the number of slices. In response to the size of the original image being the same as the size to be sliced, the original image is used as the original image to be sliced. In response to the size of the original image being different from the size to be sliced, the size of the original image is adjusted to obtain the original image to be sliced. The size of the original image to be sliced is the same as the size to be sliced.

For example, in the image processing method according to at least one embodiment of the disclosure, a number of slices L is obtained through the following equation:

$$L=\mathrm{round}(m/p)\times\mathrm{round}(n/q)$$

where the size of the original image is m×n, the second slice size is ×q, and round(*) indicates a rounding function.

For example, in the image processing method according to at least one embodiment of the disclosure, processing the first binary image to obtain the pixel circumscribed contour image includes the following steps. Blurring processing is performed on the first binary image to obtain a blur image. XOR processing is performed on the blur image and the first binary image to obtain the pixel circumscribed contour image.

For example, in the image processing method according to at least one embodiment of the disclosure, synthesizing the second binary image and the first binary image according to the positions of the circumscribed contour pixels in the pixel circumscribed contour image to obtain the synthetic image includes the following steps. The positions of the circumscribed contour pixels in the pixel circumscribed contour image are obtained. Multiple target second binary pixels at positions in the second binary image corresponding to the positions of the circumscribed contour pixels are extracted. The target second binary pixels in the second binary image are respectively synthesized to same positions in the first binary image according to a pixel correspondence between the second binary image and the first binary image to obtain the synthetic image.

For example, in the image processing method according to at least one embodiment of the disclosure, processing the original image through the second binarization model to obtain the second binary image includes the following steps. Grayscale processing is performed on the original image to obtain a grayscale image. The grayscale image is processed according to a first threshold to obtain an intermediate binary image. Guiding filtering processing is performed on the grayscale image by using the intermediate binary image as a guiding image to obtain a filter image. A high-value pixel in the filter image is determined according to the second threshold.

A grayscale value of the high-value pixel is greater than the second threshold. Expanding processing is performed on the grayscale value of the high-value pixel according to a preset expansion coefficient to obtain an expansion image. Sharpening processing is performed on the expansion image to obtain a clear image. A contrast of the clear image is adjusted to obtain the second binary image.

For example, in the image processing method according to at least one embodiment of the disclosure further includes the following step. Black edge removal processing is performed on the synthetic image.

For example, in the image processing method according to at least one embodiment of the disclosure, performing black edge removal processing on the synthetic image includes the following steps. An edge region of the synthetic image is determined. The edge region of the synthetic image is traversed to judge whether there is a black region whose size exceeds a preset threshold. In response to the edge region including at least one black region whose size exceeds the preset threshold, a grayscale value of a pixel corresponding to the at least one black region is set to a preset grayscale value.

At least one embodiment of the disclosure provides an image processing device, which includes the following. An obtaining module is configured to obtain an original image. The original image includes at least one object. A slicing module is configured to perform slicing processing on the original image to obtain multiple slice images of the original image. A first binarization module is configured to respectively process the slice images through a first binarization model to obtain multiple slice binary images respectively corresponding to the slice images. A stitching module is configured to perform stitching processing on the slice binary images to obtain a first binary image. A processing module is configured to process the first binary image to obtain a pixel circumscribed contour image. The pixel circumscribed contour image includes multiple circumscribed contour pixels. Pixels in a region surrounded by the circumscribed contour pixels are pixels corresponding to at least a part of the at least one object.

A second binarization module is configured to process the original image through a second binarization model to obtain a second binary image. A synthesis module is configured to synthesize the second binary image and the first binary image according to positions of the circumscribed contour pixels in the pixel circumscribed contour image to obtain a synthetic image. The synthetic image is a binary image.

At least one embodiment of the disclosure provides an electronic apparatus, which includes the following. A memory is configured to non-transitorily store a computer-readable instruction. A processor is configured to run the computer-readable instruction. When the computer-readable instruction is run by the processor, an image processing method according to any embodiment of the disclosure is implemented.

At least one embodiment of the disclosure provides a non-transitory computer-readable storage medium. The non-transitory computer-readable storage medium stores a computer-readable instruction. When the computer-readable instruction is executed by a processor, an image processing method according to any embodiment of the disclosure is implemented.

BRIEF DESCRIPTION OF THE DRAWINGS

In order to explain the technical solutions according to the embodiments of the disclosure more clearly, the drawings of the embodiments will be briefly introduced below. Obviously, the drawings in the following description only relate to some embodiments of the disclosure, rather than limit the disclosure.

FIG. 11 is a schematic diagram of a second binary image according to an embodiment of the disclosure.

FIG. 12 is a schematic diagram of a synthetic image according to an embodiment of the disclosure.

FIG. 13b is a synthetic image with black edges removed according to an embodiment of the disclosure.

DETAILED DESCRIPTION OF DISCLOSED EMBODIMENTS

Figure 1:
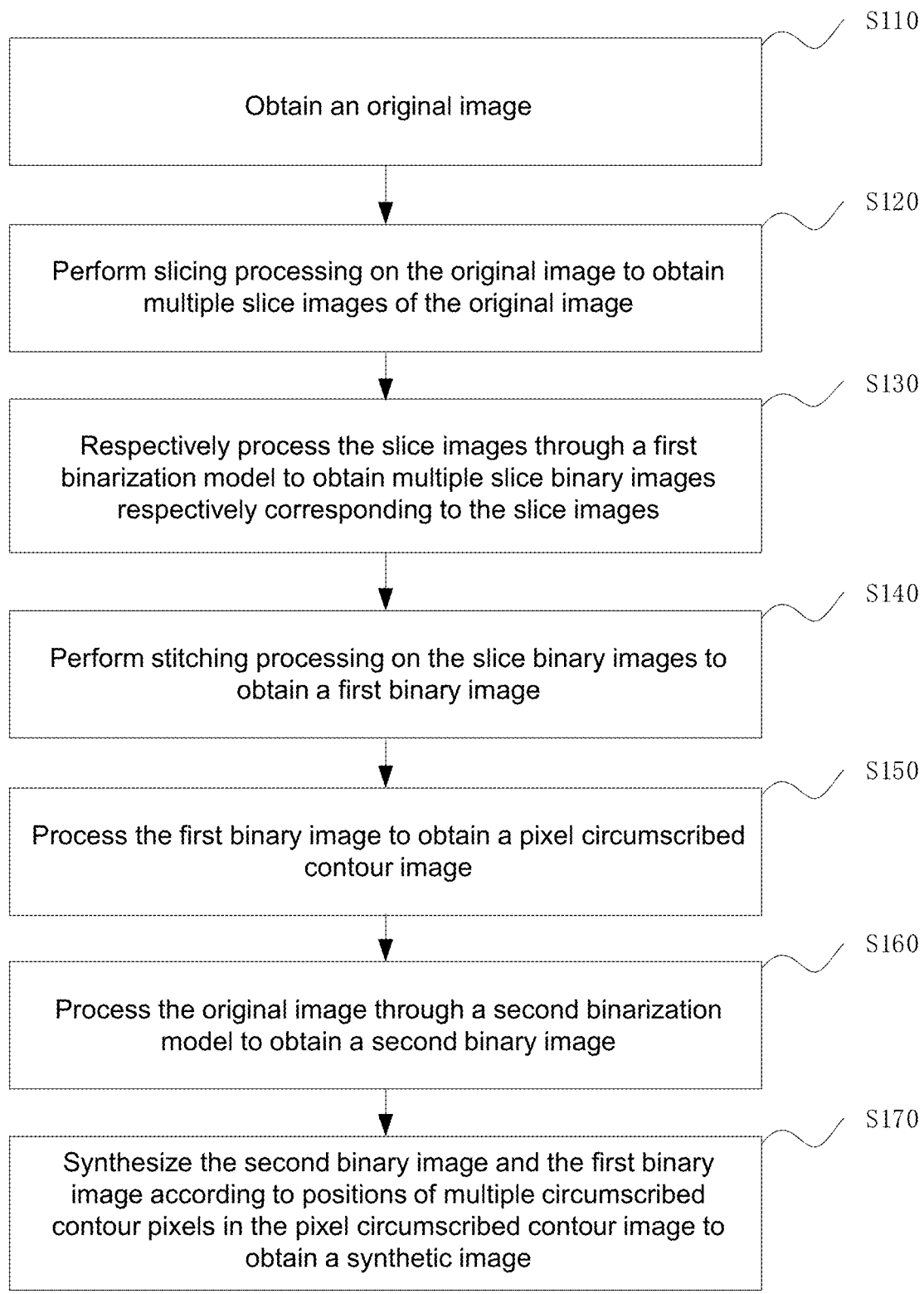
FIG. 1 is a schematic flowchart of an image processing method according to at least one embodiment of the disclosure.

In order for the objectives, technical solutions, and advantages of the embodiments of the disclosure to be clearer, the technical solutions of the embodiments of the disclosure will be described clearly and completely in conjunction with the accompanying drawings. Obviously, the described embodiments are part of the embodiments of the disclosure, rather than all of the embodiments. Based on the described embodiments of the disclosure, all other embodiments obtained by persons skilled in the art without inventive efforts are within the protection scope of the disclosure.

Unless otherwise defined, the technical terms or scientific terms used in the disclosure shall have the conventional meanings understood by persons skilled in the art to which the disclosure belongs. Similar words such as "first" and "second" used in the disclosure do not indicate any order, quantity, or importance, but are only used to distinguish different components. Similarly, similar words such as "one", "a", or "the" do not indicate a quantity limit, but rather indicate that there is at least one. Similar words such as "include" or "comprise" mean that an element or an item appearing before the word covers an element or an item listed after the word or the item and its equivalents, but does not exclude other elements or items. Similar words such as "connected to" or "connected with" are not limited to physical or mechanical connections, but may include electrical connections, whether direct or indirect. Terms such as "up", "down", "left", and "right" are only used to indicate a relative positional relationship. After the absolute position of a described object changes, the relative positional relationship may also change accordingly.

In order to keep the following description of the embodiments of the disclosure clear and concise, the disclosure omits detailed description of some known functions and known components.

In the binarization processing method in the prior art, the processing speed of binarization processing is reduced when the size of an original image is relatively large, so an image compression ratio generally needs to be set according to processing speed and image quality. However, if the compression ratio is set to be larger, although the processing speed may be improved, the quality of the final binary image may be poorer; and if the compression ratio is set to be smaller, although a binary image with better quality may be obtained, the processing speed is slower, that is, the process of performing binarization processing on the original image is longer.

At least one embodiment of the disclosure provides an image processing method, an image processing device, an electronic apparatus, and a non-transitory computer-readable storage medium. The image processing method includes obtaining an original image, wherein the original image includes at least one object; performing slicing processing on the original image to obtain multiple slice images of the original image; respectively processing the slice images through a first binarization model to obtain multiple slice binary images respectively corresponding to the slice images; performing stitching processing on the slice binary images to obtain a first binary image; processing the first binary image to obtain a pixel circumscribed contour image, wherein the pixel circumscribed contour image includes multiple circumscribed contour pixels, and pixels in a region surrounded by the circumscribed contour pixels are pixels corresponding to at least a part of the at least one object; processing the original image through a second binarization model to obtain a second binary image; and synthesizing the second binary image and the first binary image according to positions of the circumscribed contour pixels in the pixel circumscribed contour image to obtain a synthetic image, wherein the synthetic image is a binary image. The image processing method can adopt a slicing processing manner on the original image, divide the image with larger size into multiple slice images, and then respectively process the slice images to implement fast binarization processing of the image and ensure image quality while improving image processing speed. As such, the image processing method according to the embodiments of the disclosure may be applied to a mobile terminal such as a mobile phone. On the basis of improving processing speed, the original image does not need to be compressed, so that image details are not lost while implementing real-time processing of an image acquired by the mobile phone.

In addition, the image processing method can convert an original image (for example, a color image or an unclear image) into a synthetic image with obvious and clear black and white contrast, which effectively improves the quality of the synthetic image and improves the readability of the image content. Moreover, the converted synthetic image has less noise interference and obvious black and white contrast, thereby effectively improving the printing effect.

It should be noted that the image processing method according to an embodiment of the disclosure may be applied to an image processing device according to an embodiment of the disclosure. The image processing device may be configured on an electronic apparatus. The electronic apparatus may be a personal computer, a mobile terminal, etc. The mobile terminal may be a hardware apparatus with various operating systems, such as a mobile phone or a tablet computer.

The embodiments of the disclosure will be described in detail below with reference to the accompanying drawings, but the disclosure is not limited to the specific embodiments.

Figure 2:
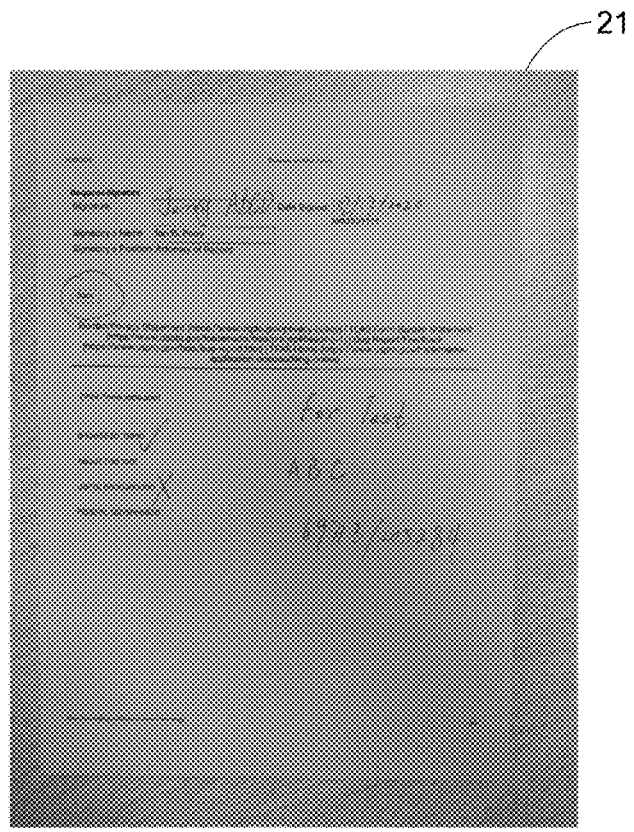
FIG. 2 is a schematic diagram of an original image according to at least one embodiment of the disclosure.

FIG. 1 is a schematic flowchart of an image processing method according to at least one embodiment of the disclosure. FIG. 2 is a schematic diagram of an original image according to at least one embodiment of the disclosure.

For example, as shown in FIG. 1, the image processing method according to an embodiment of the disclosure includes Steps S110 to S170.

As shown in FIG. 1, firstly, Step S110 of the image processing method includes obtaining an original image.

For example, the original image includes at least one object. The object may be a character. The character may include Chinese (for example, Chinese character or pinyin), English, Japanese, French, Korean, Latin, numbers, etc. In addition, the object may also include various symbols (for example, greater-than sign, less-than sign, percent sign, etc.) various graphics, etc. The at least one object may include a printed or machine input character and may also include a handwritten character. For example, as shown in FIG. 2, in some embodiments, an object in the original image may include a printed word and letter (for example, English, Japanese, French, Korean, German, Latin, and other languages and texts of different countries), a printed number (for example, date, weight, size, etc.), a printed symbol and image, a handwritten word and letter, a handwritten number, a handwritten symbol and graphics, etc.

For example, the original image may be various types of images, such as an image of a shopping list, an image of a catering receipt, an image of a test paper, an image of a contract, etc. As shown in FIG. 2, the original image 21 may be an image of a letter.

For example, the shape of the original image may be a rectangle, etc. The shape and size of the original image may be set by the user according to actual situations.

For example, the original image may be an image captured through an image acquisition device (for example, a digital camera, a mobile phone, etc.). The original image may be a grayscale image or a color image. It should be noted that the original image refers to a form of presenting an object to be processed (for example, a test paper, a contract, a shopping receipt, etc.) in a visual manner, such as an image of the object to be processed. For another example, the original image may also be obtained through scanning. For example, the original image may be an image directly acquired by the image acquisition device or an image obtained after preprocessing the collected image. For example, in order to avoid the impact of data quality and data imbalance of the original image on image processing, before processing the original image, the image processing method according to at least one embodiment of the disclosure may further include an operation of preprocessing the original image. Preprocessing may include, for example, performing cropping, gamma correction, noise reduction filtering, or other processing on the image directly acquired by the image acquisition device. Preprocessing may eliminate irrelevant information or noise information in the original image, so that image processing may be better performed on the original image.

Next, in Step S120, slicing processing is performed on the original image to obtain multiple slice images of the original image.

Figure 3:
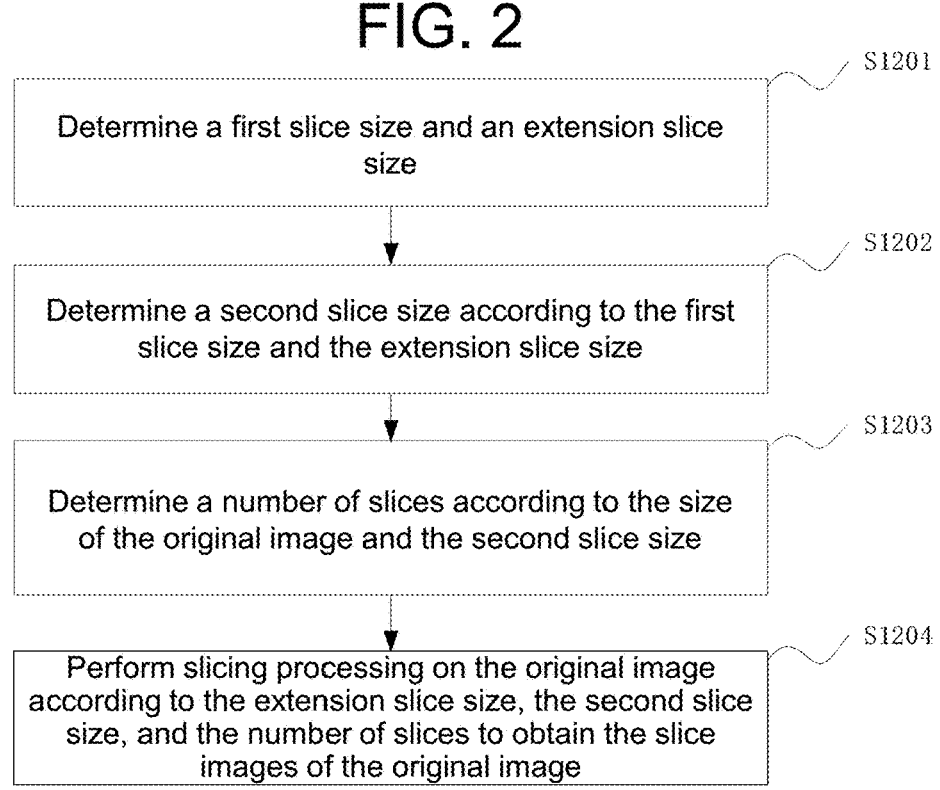
FIG. 3 is an exemplary flowchart of Step S120 in the image processing method shown in FIG. 1.

For example, in at least one embodiment of the disclosure, as shown in FIG. 3, Step S120 of the image processing method may specifically include Step S1201 to Step S1204.

In Step S1201, a first slice size and an extension slice size are determined.

For example, the first slice size is the actual slice size, that is, the size of the slice image after the original image is sliced. The width and the height corresponding to the first slice size are equal, and the width and the height corresponding to the first slice size may also be not equal. For example, in at least one embodiment of the disclosure, the first slice size may be 576×576. The first slice size may be set according to actual situations.

The extension slice size is the image extension size when the original image is sliced, which is set according to image processing requirements and image processing effects. For example, in at least one embodiment of the disclosure, the extension slice size may be 48, 64, etc. The extension slice size may be set according to actual situations. For example, when the extension slice size is 48, the image processing effects are better. When the size is 64, the image processing effects are better. However, the final target slice size (a second slice size described later) is smaller.

For example, during the process of image processing, the first slice size and the extension slice size remain unchanged.

In Step S1202, the second slice size is determined according to the first slice size and the extension slice size.

For example, in at least one embodiment of the disclosure, when the extension slice size is a single-edge extension size, the width corresponding to the second slice size is the width corresponding to the first slice size minus twice the single-edge extension size, and the height corresponding to the second slice size is the height corresponding to the first slice size minus twice the single-edge extension size. For example, if the first slice size is 576×576 and the extension slice size is 48, the second slice size is 480×480. When slicing processing is performed on the original image, slicing processing is performed according to the first slice size, and the first slice size is larger than the second slice size (the target slice size), so as to avoid losing edge details, so that there will be overlap between the slice images.

In Step S1203, a number of slices is determined according to the size of the original image and the second slice size.

The number of slices L is obtained through the following equation:

$$L = \text{round}(m/p) \times \text{round}(n/q) \tag{1}$$

where the size of the original image is m×n, the second slice size is p×q, m is the width of the original image, n is the height of the original image, p is the width corresponding to the second slice size, q is the height corresponding to the second slice size, and round(*) indicates a rounding function.

For example, in some examples, the size of the original image is 1440×1440. It should be noted that the size of the original image is not limited thereto and may be set according to actual situations. The second slice size is 480×480, and the number of slices is L=round(1440/480)×round(1440/480)=9, that is, the original image is finally sliced into 9 slice images. For another example, in some other examples, the size of the original image is 1000×1000, the second slice size is 480×480, and the number of slices is L=round(1000/480)×round(1000/480)=4, that is, the original image is finally sliced into 4 slice images.

In Step S1204, slicing processing is performed on the original image according to the extension slice size, the second slice size, and the number of slices to obtain the slice images of the original image.

For example, in at least one embodiment of the disclosure, Step S1204 includes determining an original image to be sliced based on the original image according to the second slice size and the number of slices; and performing slicing processing on the original image to be sliced based on the second slice size and the extension slice size to obtain the slice images.

Figure 4:
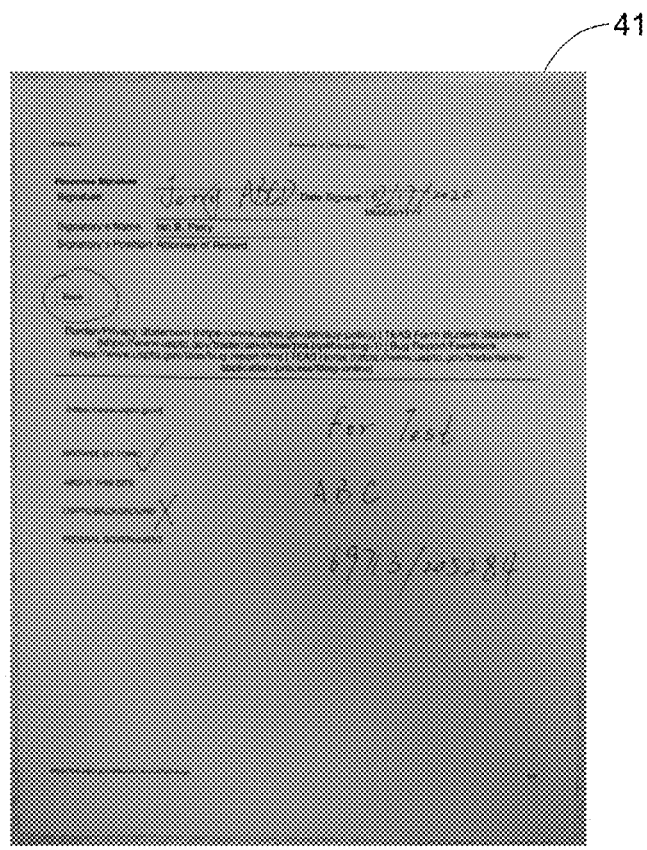
FIG. 4 is a schematic diagram of an original image to be sliced according to an embodiment of the disclosure.

FIG. 4 is a schematic diagram of an original image to be sliced according to an embodiment of the disclosure. For example, the original image to be sliced 41 in FIG. 4 may be an image after size adjustment is performed on the original image 21 in FIG. 2.

Determining the original image to be sliced based on the original image according to the second slice size and the number of slices may include determining a size to be sliced according to the second slice size and the number of slices; in response to the size of the original image being the same as the size to be sliced, using the original image as the original image to be sliced; and in response to the size of the original image being different from the size to be sliced, adjusting the size of the original image to obtain the original image to be sliced, wherein the size of the original image to be sliced is the same as the size to be sliced.

For example, the size to be sliced may be obtained through the following calculation equation:

$$H = \text{round}(n/q) \times q \tag{2}$$

$$W = \text{round}(m/p) \times p \tag{3}$$

where the size to be sliced is indicated as W×H, m is the width of the original image, n is the height of the original image, p is the width corresponding to the second slice size, q is the height corresponding to the second slice size, and round(*) is the rounding function. For example, the size of the original image to be sliced is the same as the size to be sliced, so the size of the original image to be sliced is W×H, that is, the width of the original image to be sliced is W and the height of the original image to be sliced is H.

For example, in some embodiments, when the original image may be sliced into a whole relative to the second slice size, the original image may be directly used as the original image to be sliced. For example, the size of the original image is 1440×960 and the second slice size is 480×480. The size to be sliced W (W=round(1440/480)×480)×H (H=round(960/480)×480) calculated according to the calculation equations (2) and (3) of the size to be sliced is 1440×960. At this time, the size of the original image is the same as the size to be sliced, so the original image is used as the original image to be sliced.

For example, in other embodiments, when the original image cannot be sliced into a whole relative to the second slice size, the original image may be directly adjusted to obtain the original image to be sliced. For example, the size of the original image is 1500×1000, the second slice size is 480×480, and the size to be sliced W (W=round(1500/480)× 480)×H (H=round(1000/480)×480) calculated according to the calculation equations (2) and (3) of the size to be sliced is 1440×960. At this time, the size of the original image is different from the size to be sliced, so the size of the original image is adjusted to 1440×960 to obtain the original image to be sliced.

Figure 5A:
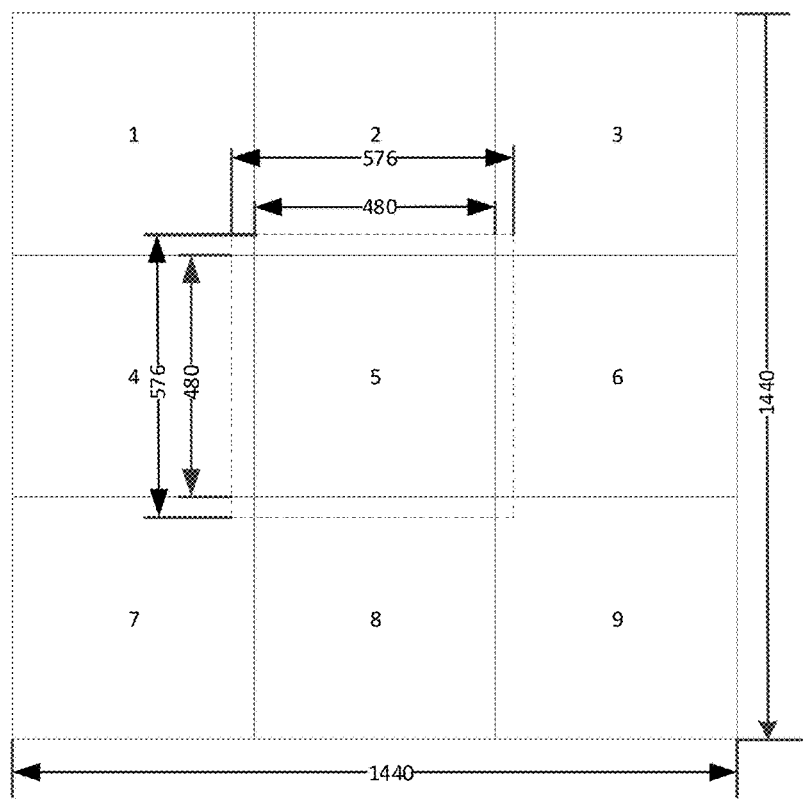
FIGS. 5a to 5c are schematic diagrams of a process of image slicing processing according to at least one embodiment of the disclosure.
Figure 5B:
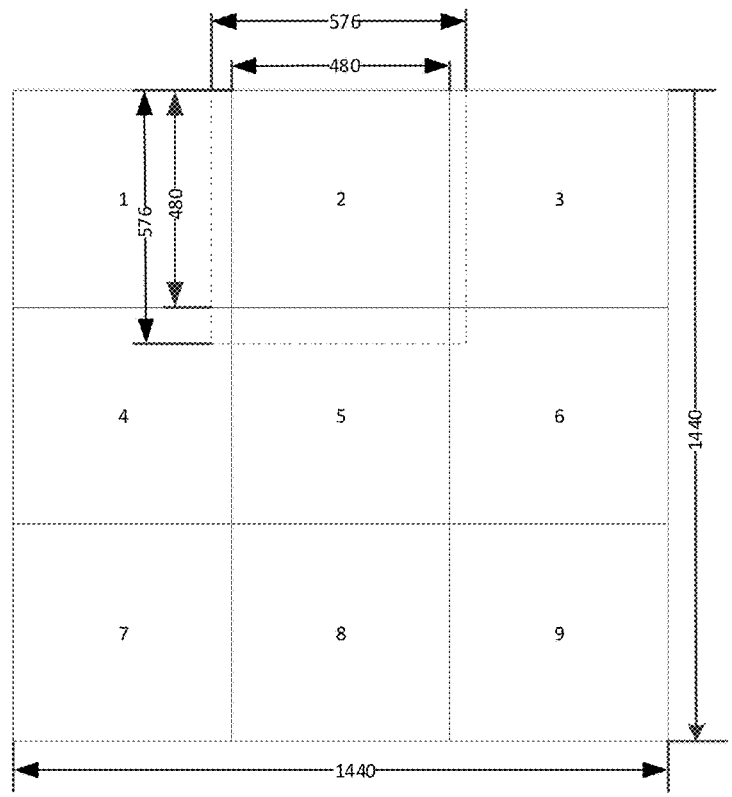
Figure 5C:
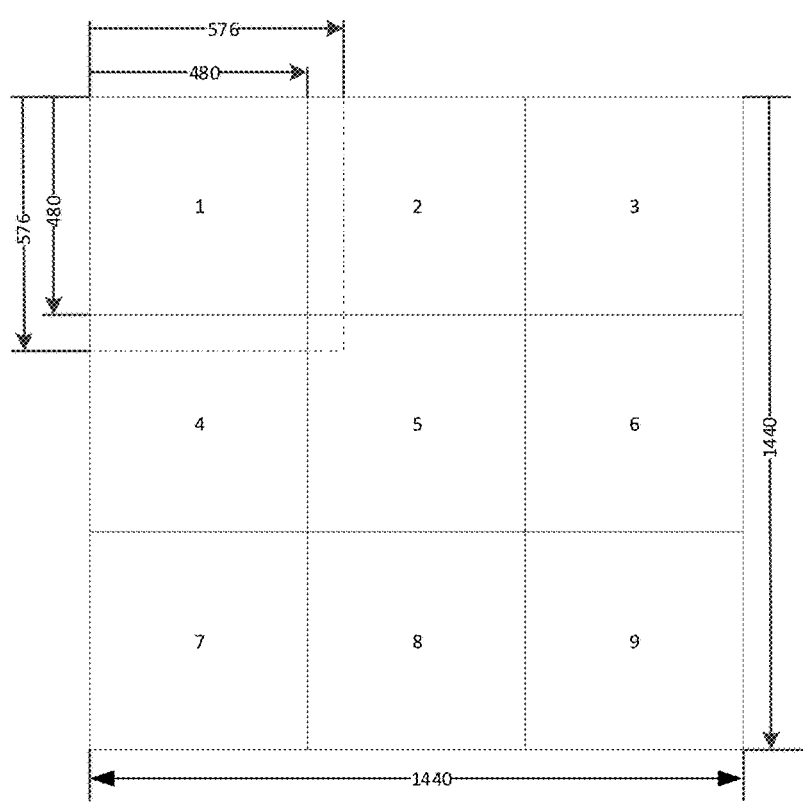
Figure 6A:
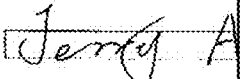
FIGS. 6a to 6i are schematic diagrams of slice binary images according to an embodiment of the disclosure.
Figure 6B:
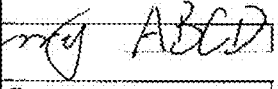
Figure 6C:
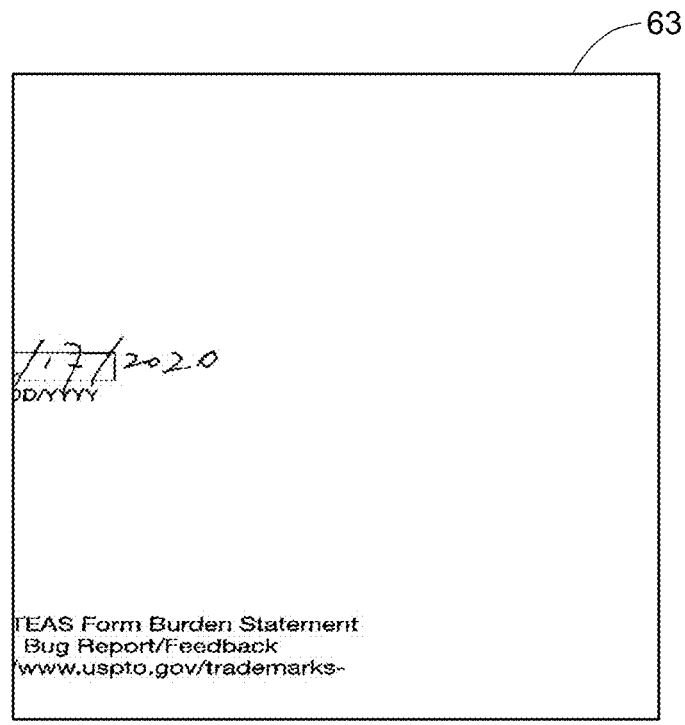
Figure 6D:
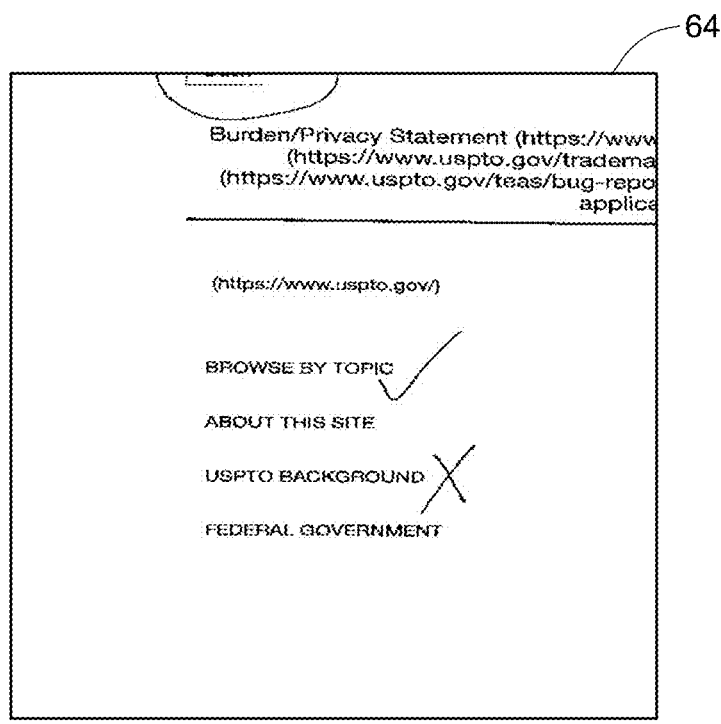
Figure 6E:
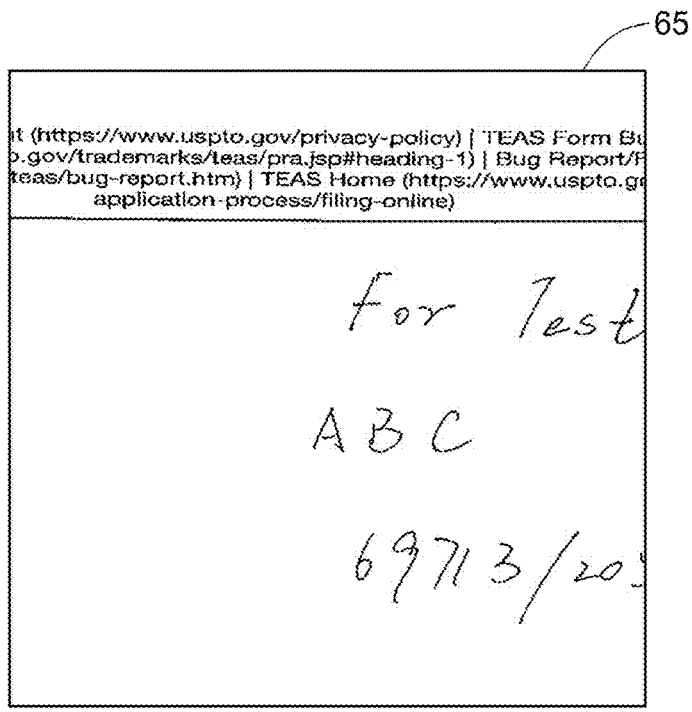
Figure 6F:
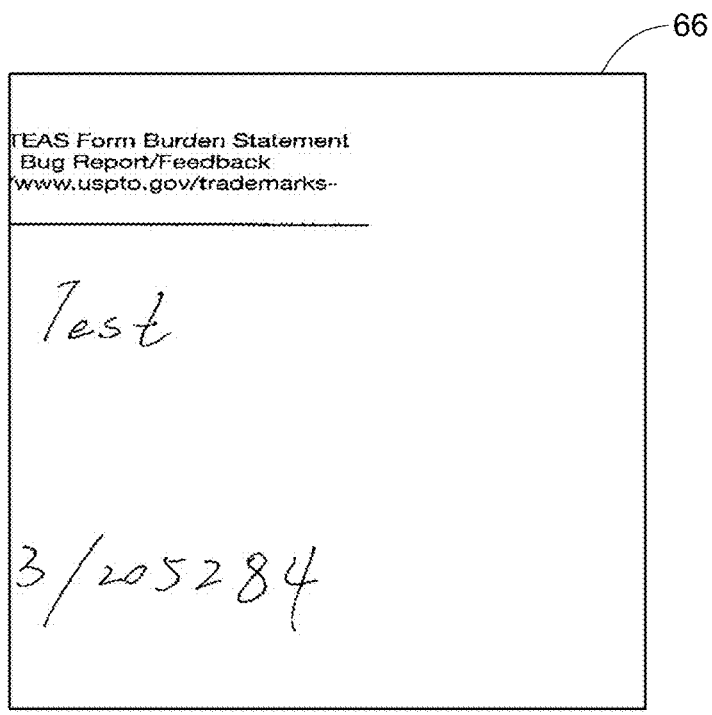
Figure 6G:
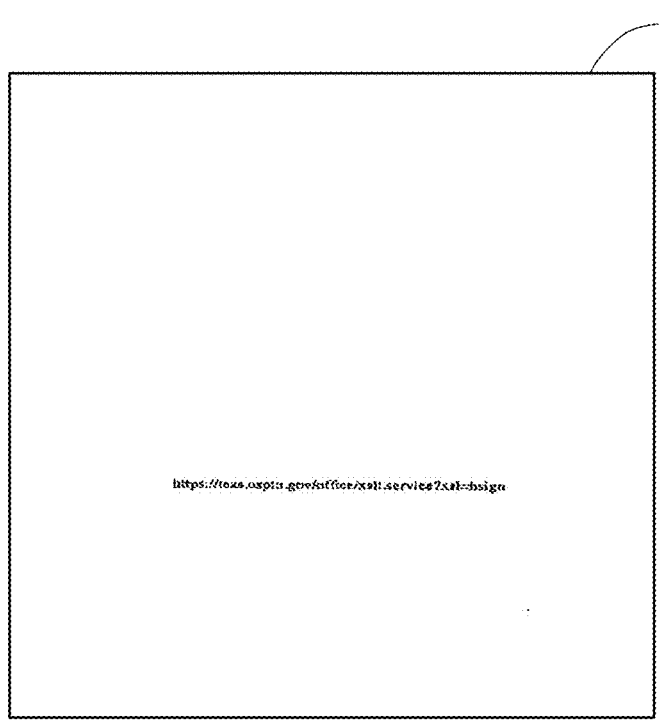
Figure 6H:
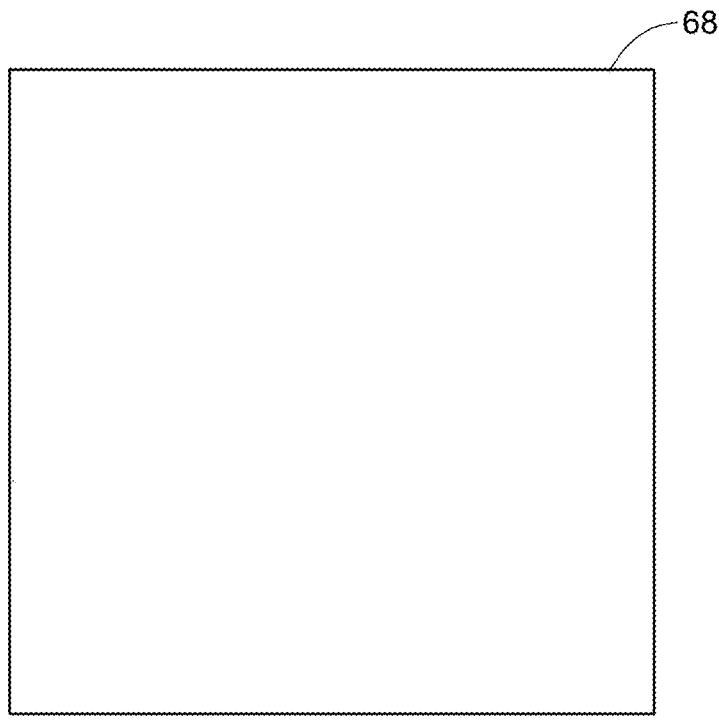
Figure 6I:
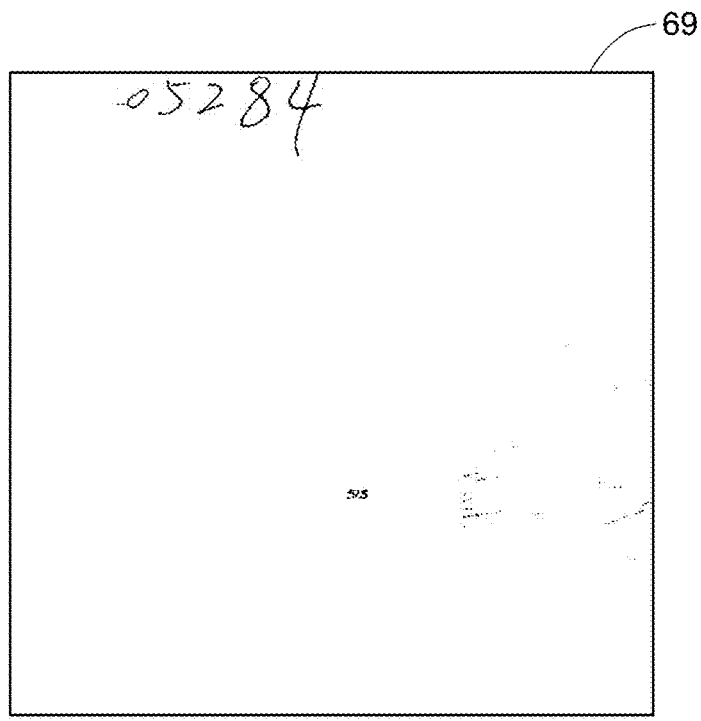

FIG. 5a to FIG. 5c are schematic diagrams of a process of image slicing processing according to at least one embodiment of the disclosure. As shown in FIG. 5a to FIG. 5c, the size of the original image is 1440×1440, the first slice size is 576×576, the second slice size is 480×480, and the extension slice size is 48. According to the above description, the original image may be divided into 9 subregions, that is, the original image may be sliced into 9 slice images. The number in each subregion represents the numbering of the subregion, that is, a slice numbering.

It should be noted that in the embodiments of the disclosure, the unit of size is all pixels. In other words, for example, the first slice size is 576×576, which indicates that the first slice size is 576 pixels×576 pixels.

For example, in some embodiments, in Step S1204, performing slicing processing on the original image to be sliced based on the second slice size and the extension slice size to obtain the slice images may include dividing the original image to be sliced into the subregions according to the second slice size, wherein a number of subregions is equal to the number of slices; and then, slicing processing is performed on the original image to be sliced according to the extension slice size and the subregions to obtain the slice images. For example, the slice images correspond to the subregions one-to-one, and the size of each slice image in the slice images is the first slice size and includes a corresponding subregion in the subregions.

For example, the original image includes four fixed edges. Each subregion in the subregions includes four region edges. Performing slicing processing on the original image to be sliced according to the extension slice size and the subregions to obtain the slice images includes in response to all four region edges corresponding to an i-th subregion in the subregions not overlapping with the four fixed edges, respectively extending the four region edges corresponding to the i-th subregion by the extension slice size in a direction away from the i-th subregion with the i-th subregion as a center to obtain a slice position corresponding to a slice image corresponding to the i-th subregion, and slicing the original image to be sliced according to the slice position to obtain the slice image corresponding to the i-th subregion; in response to one region edge in four region edges corresponding to an i-th subregion in the subregions overlapping with one fixed edge in the four fixed edges, extending a region edge opposite to the one region edge in the four region edges by twice the extension slice size in a direction away from the i-th subregion, and respectively extending region edges adjacent to the one region edge in the four region edges by the extension slice size in the direction away from the i-th subregion to obtain a slice position corresponding to a slice image corresponding to the i-th subregion, and slicing the original image to be sliced according to the slice position to obtain the slice image corresponding to the i-th subregion; or in response to two region edges in four region edges corresponding to an i-th subregion in the subregions overlapping with two fixed edges in the four fixed edges, extending other region edges other than the two region edges in the four region edges by twice the extension slice size in a direction away from the i-th subregion to obtain a slice position corresponding to a slice image corresponding to the i-th subregion, and slicing the original image to be sliced according to the slice position to obtain the slice image corresponding to the i-th subregion.

For example, i is a positive integer and is less than or equal to the number of subregions.

For example, as shown in FIG. 5a, in some embodiments, in the case where all four region edges corresponding to the i-th subregion in the subregions do not overlap with the four fixed edges, for example, for a subregion numbered 5 in the subregions, that is, when i is 5, all four region edges corresponding to the i-th subregion do not overlap with the four fixed edges. At this time, the four region edges corresponding to the i-th subregion are respectively extended by the extension slice size in a direction away from the i-th subregion with the i-th subregion as the center to obtain the slice position corresponding to the slice image corresponding to the i-th subregion, and the original image to be sliced is sliced according to the slice position to obtain the slice image corresponding to the i-th subregion. For example, in some examples, the size of the 5-th subregion is 480×480. The four region edges of the 5-th subregion are respectively extended by 48 pixels in the direction away from the 5-th subregion to obtain a dashed frame containing four dashed lines in FIG. 5a, that is, the slice position. A region defined by the dashed frame is the region of the slice image corresponding to the 5-th subregion. The original image to be sliced is sliced according to the slice position to obtain the slice image corresponding to the 5-th subregion. The size of the slice image is 576×576.

For example, as shown in FIG. 5b, in some embodiments, in the case where one region edge in the four region edges corresponding to the i-th subregion in the subregions overlaps with one fixed edge in the four fixed edges, for example, for subregions numbered 2, 4, 6, and 8 in the subregions, that is, when i is 2, 4, 6 and 8, only one region edge in the four region edges corresponding to the i-th subregion overlaps with one fixed edge in the four fixed edges. At this time, the region edge opposite to the one region edge in the four region edges is extended by twice the extension slice size in the direction away from the i-th subregion, and the region edges adjacent to the one region edge in the four region edges are respectively extended by the extension slice size in the direction away from the i-th subregion to obtain the slice position corresponding to the slice image corresponding to the i-th subregion, and the original image to be sliced is sliced according to the slice position to obtain the slice image corresponding to the i-th subregion. For example, taking i being 2 as an example, the size of the 2-nd subregion is 480×480. An upper region edge of the 2-nd subregion overlaps with an upper fixed edge in the four fixed edges. At this time, the upper region edge of the 2-nd subregion remains unchanged. A lower region edge of the 2-nd subregion is extended downward (that is, extended in a direction away from the upper region edge of the 2-nd subregion) by twice the extension slice size, that is, 96 pixels. A left region edge of the 2-nd subregion is extended leftward (that is, extended in a direction away from a right region edge of the 2-nd subregion) by the extension slice size, that is, 48 pixels. The right region edge of the 2-nd subregion is extended rightward (that is, extended in a direction away from the left region edge of the 2-nd subregion) by the extension slice size, that is, 48 pixels. As such, a dashed frame containing three dashed lines in FIG. 5b, that is, the slice position, may be obtained. A region defined by the dashed frame and the upper fixed edge in the four fixed edges is the region of the slice image corresponding to the 2-nd subregion. The original image to be sliced is sliced according to the slice position to obtain the slice image corresponding to the 2-nd subregion. The size of the slice image is 576×576.

For example, as shown in FIG. 5b, a left region edge of the 4-th subregion overlaps with a left fixed edge in the four fixed edges, a right region edge of the 6-th subregion overlaps with a right fixed edge in the four fixed edges, and a lower region edge of the 8-th subregion overlaps with a lower fixed edge in the four fixed edges.

For example, as shown in FIG. 5c, in some embodiments, in the case where two region edges in the four region edges corresponding to the i-th subregion in the subregions overlap with two fixed edges in the four fixed edges, for example, for subregions numbered 1, 3, 7, and 9 in the subregions, that is, when i is 1, 3, 7, and 9, two region edges in the four region edges corresponding to the i-th subregion overlap with two fixed edges in the four fixed edges. At this time, other region edges other than the two region edges in the four region edges are extended by twice the extension slice size in the direction away from the i-th subregion to obtain the slice position corresponding to the slice image corresponding to the i-th subregion, and the original image to be sliced is sliced according to the slice position to obtain the slice image corresponding to the i-th subregion. For example, taking i being 1 as an example, the size of the 1-st subregion is 480×480. An upper region edge and a left region edge of the 1-st subregion remain unchanged. A right region edge of the 1-st subregion is extended rightward (that is, extended in a direction away from the right region edge of the 1-st subregion) by twice the extension slice size, that is, 96 pixels. A lower region edge of the 1-st subregion is extended downward (that is, extended in a direction away from the lower region edge of the 1-st subregion) by twice the extension slice size, that is, 96 pixels. As such, a dashed frame containing two dashed lines in FIG. 5c, that is, the slice position, may be obtained. A region defined by the dashed frame and the upper fixed edge and the left fixed edge in the four fixed edges is the region of the slice image corresponding to the 1-st subregion. The original image to be sliced is sliced according to the slice position to obtain the slice image corresponding to the 1-st subregion. The size of the slice image is 576×576.

It should be noted that in the embodiments of the disclosure, the upper region edge and the lower region edge are two region edges opposite to each other, and the left region edge and the right region edge are two region edges opposite to each other. The "upper", "lower", "left", and "right" are divided from the perspective of the viewer.

According to the slicing processing manner of the embodiment, the original image with a larger size may be divided into multiple slices for processing, which can ensure image processing speed while ensuring image quality to solve the issue that the image compression manner cannot balance processing speed and image quality. In addition, adopting the slicing manner in which there is overlap between the slice images enables the edge details of the slice images to be preserved and image quality to be improved.

For example, in some embodiments, in the case where the number of slice images corresponding to the original image is 1 and the size of the original image is smaller than the second slice size, for example, the size of the original image is 480×360 and the second slice size is 480×480, the number of slices calculated according to the calculation equation (1) of the number of slices is 1, that is, the original image is finally sliced into 1 slice image. At this time, the size of the original image needs to be extended to the second slice size, that is, the size of the original image is extended to 480×480 to obtain the original image to be sliced, that is, the size of the original image to be sliced is 480×480. When performing slicing processing on the original image to be sliced, since the size of the slice image is the first slice size (for example, 576×576), the size of the original image to be sliced needs to be extended to the first slice size, that is, the size of the original image to be sliced is extended to 576×576 to obtain a slice image corresponding to the original image.

For example, in other embodiments, when the number of slice images corresponding to the original image is 1 and the size of the original image is larger than the second slice size, for example, the size of the original image is 600×490 and the second slice size is 480×480, the number of slices calculated according to the calculation equation (1) of the number of slices is 1, that is, the original image is finally sliced into 1 slice image. At this time, the size of the original image needs to be reduced to the second slice size, that is, the size of the original image is adjusted to 480×480 to obtain the original image to be sliced, that is, the size of the original image to be sliced is 480×480. When performing slicing processing on the original image to be sliced, since the size of the slice image is the first slice size (for example, 576×576), the size of the original image to be sliced needs to be extended to the first slice size, that is, the size of the original image to be sliced is extended to 576×576 to obtain a slice image corresponding to the original image.

For example, in other embodiments, one of round(m/p) and round(n/q) in the calculation equation (1) of the number of slices is 1, and the other one is greater than 1 (for example, 2, 3, etc.). At this time, the original image to be sliced needs to be sliced according to the second slice size to obtain multiple intermediate slice images. Then, the size of the intermediate slice images is extended to the first slice size to obtain the slice images corresponding to the original image. For example, in an example, the original image size is 1500×480 and the second slice size is 480×480, the number of slices calculated according to the calculation equation (1) of the number of slices is L=round(1500/480)× round(480/480)=3, that is, the original image is finally sliced into 3 slice images. The size to be sliced is calculated to be 1440×480 according to the calculation equations (2) and (3) of the size to be sliced, so the size of the original image needs to be adjusted to 1440×480 to obtain the original image to be sliced with the size of 1440×480. When performing slicing processing on the original image to be sliced, the original image to be sliced is sliced into 3 intermediate slice images according to the second slice size. The size of each intermediate slice image is the second slice size, that is, 480×480. Then, the size of each intermediate slice image is extended to the first slice size, that is, 576×576 to obtain 3 slice images.

Next, as shown in FIG. 1, in Step S130, the slice images are respectively processed through a first binarization model to obtain multiple slice binary images respectively corresponding to the slice images.

For example, the first binarization model is a model based on a neural network. For example, the first binarization model may be implemented by adopting machine learning technology and may be, for example, run on a general-purpose computing device or a special-purpose computing device. The first binarization model is a neural network model obtained by pre-training. For example, the first binarization model may be implemented by adopting a neural network such as a U-Net neural network, a neural network similar to the U-Net neural network, and a Mask R-CNN neural network.

For example, the first binarization model is used to perform binarization processing on the original image to obtain a first binary image. Binarization processing is to set the grayscale value of pixels on the original image to a first grayscale value (for example, 0) or a second grayscale value (for example, 255), that is, a process for the entire original image to present an obvious black and white effect.

For example, a first binarization model to be trained may be trained through a large number of original training images and images of the original training images after binarization. Then, the first binarization model (for example, the neural network model such as the U-Net neural network) is established. For the process of training the first binarization model to be trained to establish the first binarization model, reference may be made to the training process in the neural network field, and the specific process will not be repeated.

It should be noted that in some embodiments, an existing binarization processing manner may also be adopted to perform binarization processing on the original image to obtain the first binary image. For example, the binarization processing manner may include a threshold method. The threshold method includes setting a binarization threshold, and comparing a grayscale value of each pixel in an original image to the binarization threshold. If the grayscale value of a certain pixel in the original image is greater than or equal to the binarization threshold, the grayscale value of the pixel is set to 255 grayscale. If the grayscale value of a certain pixel in the original image is less than the binarization threshold, the grayscale value of the pixel is set to 0 grayscale. As such, the performance of binarization processing on the original image may be implemented. For example, a selection method of the binarization threshold includes a bimodal method, a P-parameter method, a big law method (Otsu's method), a maximum entropy method, an iterative method, etc.

For example, FIGS. 6a to 6i are slice binary images after performing slicing processing and binarization processing on an original image according to at least one embodiment of the disclosure. For example, the images in FIGS. 6a to 6i may be the slice binary images 61-69 after processing the original image to be sliced 41 in FIG. 4 according to Step S120 and Step S130. The original image to be sliced is sliced into 9 slice images. Then, binarization processing is respectively performed on the 9 slice images to obtain 9 slice binary images, which respectively correspond to the slice binary images 61-69. For example, the original image to be sliced 41 shown in FIG. 4 is sliced according to the slicing manner shown in FIGS. 5a to 5c to obtain the slice images. The slice images are respectively processed according to Step 130 to obtain the corresponding slice binary images. The slice binary images corresponding to the subregions numbered 1 to 9 shown in FIGS. 5a to 5c respectively correspond to the slice binary images 61-69. In other words, the slice binary image 61 shown in FIG. 6a corresponds to a part in the original image to be sliced 41 shown in FIG. 4 that corresponds to the subregion numbered 1, and so on.

Next, as shown in FIG. 1, in Step S140, stitching processing is performed on the slice binary images to obtain the first binary image.

Figure 7A:
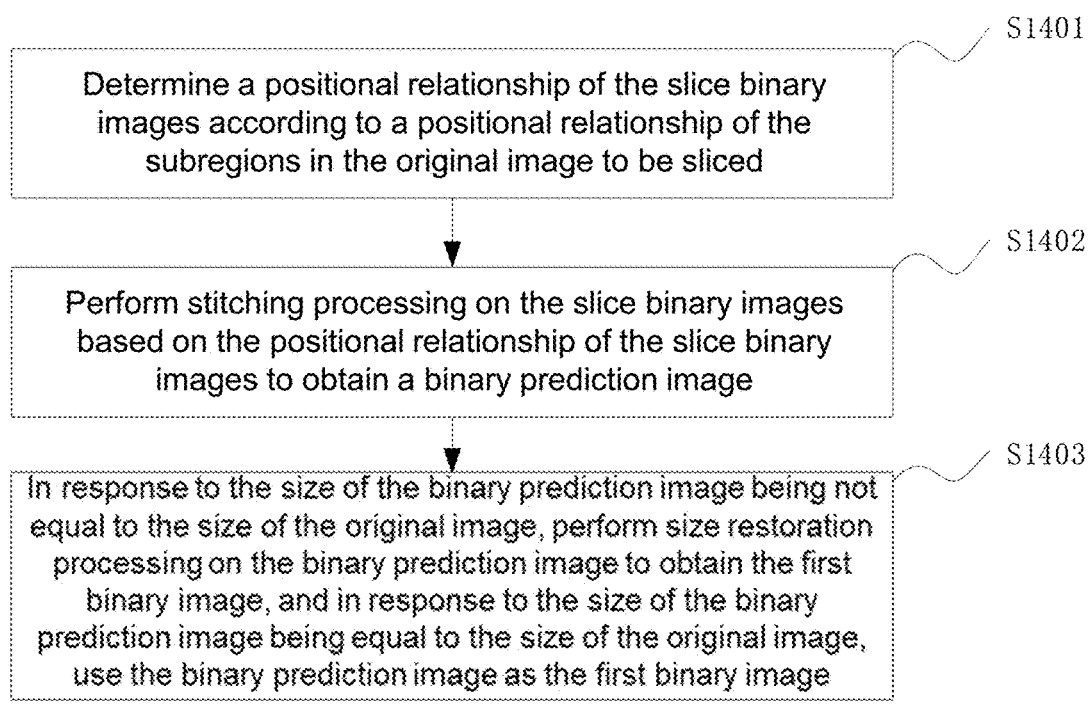
FIG. 7a is an exemplary flowchart of Step S140 in the image processing method shown in FIG. 1.

For example, in at least one embodiment of the disclosure, as shown in FIG. 7a, Step S140 of the image processing method may specifically include Step S1401 to Step S1403.

In Step S1401, a positional relationship of the slice binary images is determined according to a positional relationship of the subregions in the original image to be sliced.

In Step S1402, stitching processing is performed on the slice binary images based on the positional relationship of the slice binary images to obtain a binary prediction image.

In Step S1403, in response to the size of the binary prediction image being not equal to the size of the original image, size restoration processing is performed on the binary prediction image to obtain the first binary image, and in response to the size of the binary prediction image being equal to the size of the original image, the binary prediction image is used as the first binary image.

For example, the size of the first binary image is the same as the size of the original image.

For example, in at least one embodiment of the disclosure, all pixels in the first binary image are arranged in n rows and m columns. Step S1402 includes performing stitching processing on the slice binary images based on the positional relationship of the slice binary images to obtain an intermediate binary prediction image, wherein all pixels in the intermediate binary prediction image are also arranged in n rows and m columns; in response to a t1-th row and a t2-th column in the intermediate binary prediction image including only one pixel, using a grayscale value of the one pixel located in the t1-th row and the t2-th column as a grayscale value of a pixel in a t1-th row and a t2-th column in the binary prediction image; and in response to the t1-th row and the t2-th column in the intermediate binary prediction image including multiple pixels, performing OR operation on grayscale values of the pixels located in the t1-th row and the t2-th column to obtain grayscale values of pixels in the t1-th row and the t2-th column in the binary prediction image.

For example, n, m, t1, and t2 are all positive integers, t1 is less than or equal to n, and t2 is less than or equal to m.

Figure 7B:
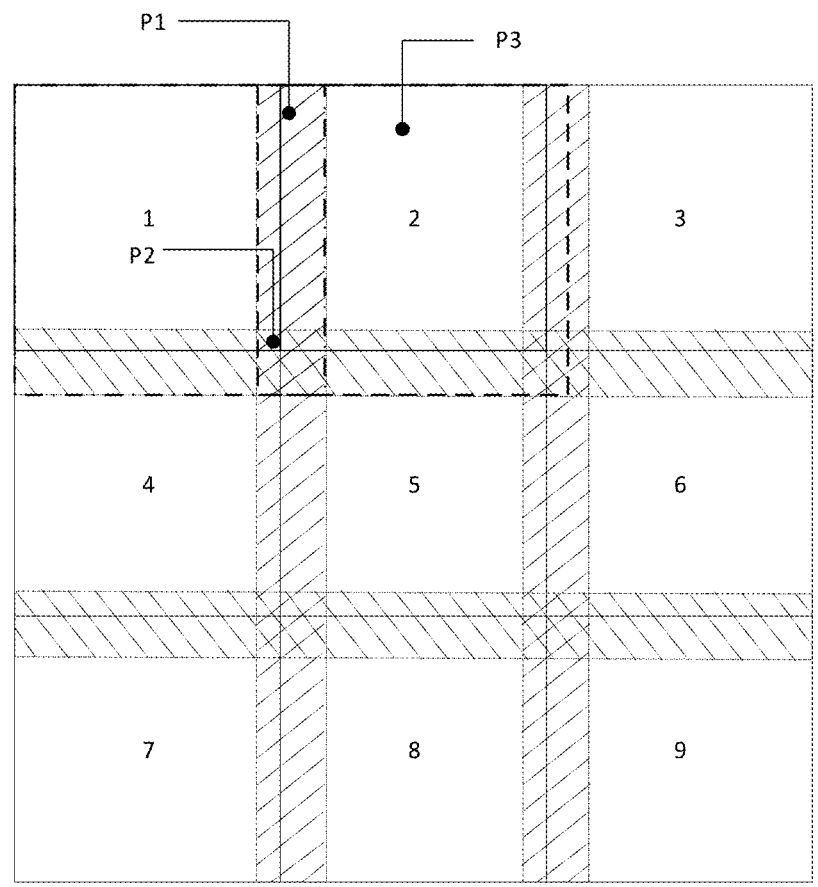
FIG. 7b is a schematic diagram of an intermediate binary prediction image according to at least one embodiment of the disclosure.

FIG. 7b is a schematic diagram of an intermediate binary prediction image according to at least one embodiment of the disclosure. For example, shaded regions in FIG. 7b indicate overlapping regions formed between the slice binary images due to size extension during the process of stitching.

For example, in some embodiments, the pixel located in the t1-th row and the t2-th column is a point P1 in FIG. 7b, and the point P1 is a certain pixel in the overlapping region between a slice binary image numbered 1 and a slice binary image numbered 2. At this time, there are 2 pixels located in the t1-th row and the t2-th column (that is, the point P1) in the intermediate binary prediction image. The 2 pixels are respectively a pixel located in a t1-th row and a t2-th column in the slice binary image numbered 1 and a pixel located in a t1-th row and a t2-th column in the slice binary image numbered 2. For example, in other embodiments, the pixel located in the t1-th row and the t2-th column is a point P2 in FIG. 7b, and the point P2 is a certain pixel in the overlapping region between the slice binary image numbered 1, the slice binary image numbered 2, a slice binary image numbered 4, and a slice binary image numbered 5. At this time, there are 4 pixels located in the t1-th row and the t2-th column (that is, the point P2) in the intermediate binary prediction image. The 4 pixels are respectively a pixel located in the t1-th row and the t2-th column in the slice binary image numbered 1, a pixel located in the t1-th row and the t2-th column in the slice binary image numbered 2, a pixel located in a t1-th row and a t2-th column in the slice binary image numbered 4, and a pixel located in a t1-th row and a t2-th column in the slice binary image numbered 5. For example, in other embodiments, the pixel located in the t1-th row and the t2-th column is a point P3 in FIG. 7b, and the point P3 is a certain pixel in a non-overlapping region (for example, in the example shown in FIG. 7b, the point P3 is a certain pixel in a non-overlapping region in the slice binary image numbered 2, but not limited thereto, the point P3 is a certain pixel in a non-overlapping region in the slice binary image numbered 1). At this time, there is one pixel located in the t1-th row and the t2-th column (that is, the point P3) in the intermediate binary prediction image. In FIG. 7b, a dot-dashed frame indicates the slice binary image numbered 1, a dashed frame indicates the slice binary image numbered 2, and a solid frame indicates a part of each slice binary image corresponding to the subregion in the slice image.

For example, taking the subregions numbered 1 and 2 in FIG. 5a and the two slice binary images numbered 1 and 2 in FIG. 7b as examples for description. Two slice images corresponding to the subregion numbered 1 and the subregion numbered 2 in FIG. 5a are respectively processed through the first binarization model to obtain the slice binary images corresponding to the two slice images, that is, the slice binary image numbered 1 and the slice binary image numbered 2. The slice binary image numbered 1 and the slice binary image numbered 2 are arranged according to the positional relationship between the subregion numbered 1 and the subregion numbered 2 in the original image. It should be noted that when performing stitching processing, since the slice image is obtained through slicing the original image based on the extension slice size and the second slice size, and the subregion numbered 1 and the subregion numbered 2 are adjacent subregions, the slice binary image corresponding to the subregion numbered 1 and the slice binary image corresponding to the subregion numbered 2 have an overlapping region, as shown by a shaded region between the slice binary image numbered 1 and the slice binary image numbered 2 in FIG. 7b.

For example, as shown in FIG. 7b, in an example, when the pixels located in the t1-th row and the t2-th column in the intermediate binary prediction image are pixels at the point P1 in the overlapping region in FIG. 7b, the point P1 has a pixel (for example, a first pixel) in the slice binary image numbered 1 and a pixel (for example, a second pixel) in the slice binary image numbered 2. OR operation is performed on grayscale values of the pixels (that is, the first pixel and the second pixel) at the point P1 to be used as grayscale values of the pixels located in the t1-th row and the t2-th column in the binary prediction image. For example, in another example, when the pixels located in the t1-th row and the t2-th column in the intermediate binary prediction image are pixels at the point P2 in the overlapping region in FIG. 7b, the point P2 has the pixel (for example, the first pixel) in the slice binary image numbered 1, the pixel (for example, the second pixel) in the slice binary image numbered 2, a pixel (for example, a third pixel) in the slice binary image numbered 4, and a pixel (for example, a fourth pixel) in the slice binary image numbered 5. OR operation is performed on grayscale values of the pixels (that is, the first pixel, the second pixel, the third pixel, and the fourth pixel) at the point P2 to be used as the grayscale values of the pixels located in the t1-th row and the t2-th column in the binary prediction image. For example, in another example, when a pixel located in the t1-th row and the t2-th column in the intermediate binary prediction image is a pixel at the point P3 in the non-overlapping region in FIG. 7b, the point P3 has the pixel (for example, the first pixel) in the slice binary image numbered 2. The pixel (that is, the first pixel) at the point P3 is used as the grayscale value of the pixel located in the t1-th row and the t2-th column in the binary prediction image.

In the embodiment, the grayscale values of the pixels in the overlapping regions are calculated in the manner of OR operation, which may merge edge features of different slice binary images to improve image quality.

For example, in at least one embodiment of the disclosure, Step S1402 includes extracting a part in each slice binary image corresponding to the subregion in the corresponding slice image to be used as an intermediate slice binary image of the slice binary image; and performing stitching processing on the intermediate slice binary images corresponding to the slice binary images based on the positional relationship of the slice binary images to obtain the binary prediction image.

For example, taking the subregion numbered 1 in FIG. 5a and the slice binary image numbered 1 in FIG. 7b as examples, the process of obtaining the intermediate slice binary image and performing stitching processing on the intermediate slice binary image will be described. The slice image corresponding to the subregion numbered 1 is processed through the first binarization model to obtain the corresponding slice binary image thereof, that is, the slice binary image numbered 1. A part of the slice binary image numbered 1 corresponding to the subregion of the slice image numbered 1, that is, a solid frame part in the slice binary image numbered 1 shown in FIG. 7b is extracted to obtain an intermediate slice binary image numbered 1. After processing all slice binary images, the intermediate slice binary images corresponding to all slice binary images are obtained. Then, all intermediate slice binary images are arranged according to the positional relationship of all slice binary images in the original image to obtain the binary prediction image.

For example, in some embodiments, in Step S1403, an interpolation method may be adopted to perform size restoration processing on the binary prediction image to obtain the first binary image. For example, if the size of the binary prediction image is 1440×960 and the size of the original image is 1500×1000, size restoration processing is performed on the binary prediction image, that is, the size of the binary prediction image is adjusted to 1500×1000 to obtain the first binary image.

For example, in Step S1403, if the size of the binary prediction image is 1440×960 and the size of the original image is also 1440×960, the binary prediction image is directly used as the first binary image.

For example, according to at least one embodiment of the disclosure, Step S120 may also be determining the second slice size; determining the number of slices according to the size of the original image and the second slice size; and performing slicing processing on the original image according to the second slice size and the number of slices to obtain the slice images of the original image, wherein the number of slice images is equal to the number of slices and the size of each slice image in the slice images is the second slice size. Performing slicing processing on the original image according to the second slice size and the number of slices to obtain the slice images of the original image includes determining the original image to be sliced based on the original image according to the second slice size and the number of slices; and performing slicing processing on the original image to be sliced based on the second slice size to obtain the slice images.

For example, the number of slice images is equal to the number of slices and the size of each slice image in the slice images is the second slice size. In other words, there is no need to perform size extension processing on the second slice size at this time, and the original image is sliced directly based on the second slice size. There is no overlapping part between the slice images.

At this time, Step S140 includes determining the positional relationship of the slice binary images according to the positional relationship of the slice images in the original image to be sliced; performing stitching processing on the slice binary images based on the positional relationship of the slice binary images to obtain the binary prediction image; and in response to the size of the binary prediction image being not equal to the size of the original image, performing size restoration processing on the binary prediction image to obtain the first binary image, and in response to the size of the binary prediction image being equal to the size of the original image, using the binary prediction image as the first binary image. In the embodiment, there is no overlapping part between the slice binary images, so there is no case where the same pixel corresponds to two grayscale values in the binary prediction image obtained by stitching the slice binary images.

For example, the size of the first binary image is the same as the size of the original image.

In the embodiment, slicing processing is performed on the original image, and the original image with a larger size is divided into multiple slices for processing, which can ensure image processing speed while ensuring image quality to solve the issue that the image compression manner cannot balance processing speed and image quality. The size of the original image to be sliced is adjusted to ensure that the size of all slice images is the first slice size to improve image processing efficiency.

Figure 8:
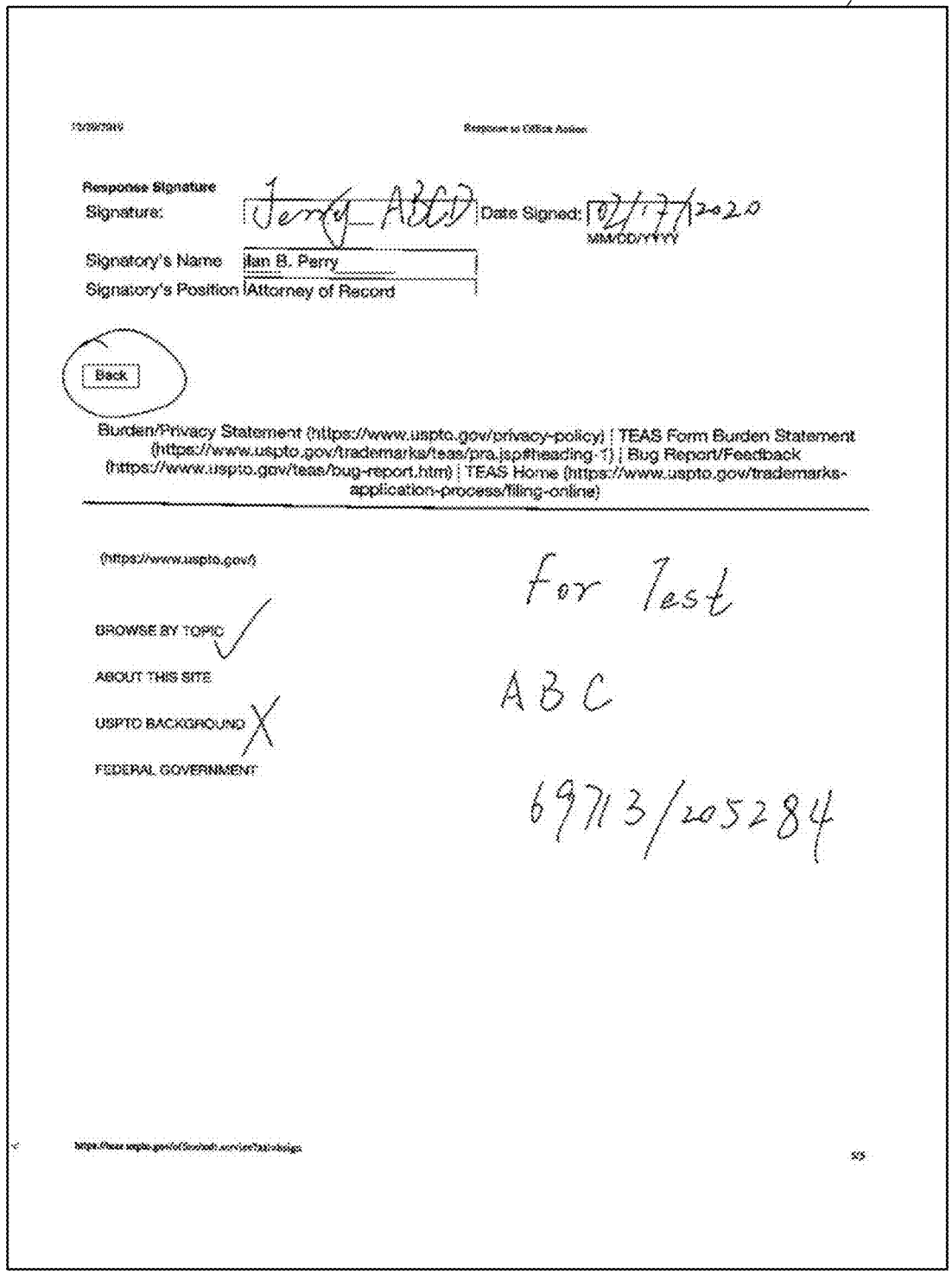
FIG. 8 is a schematic diagram of a first binary image according to an embodiment of the disclosure.

FIG. 8 is a schematic diagram of a first binary image according to an embodiment of the disclosure. For example, FIG. 8 is the first binary image 81 obtained by processing the slice binary images 61-69 of FIGS. 6a to 6i according to Step S140, which is also the first binary image 81 of the original image 21 shown in FIG. 2. For example, as shown in FIG. 8, in the first binary image 81, black pixels indicate pixels corresponding to an object and white pixels indicate pixels corresponding to a background.

Figure 9:
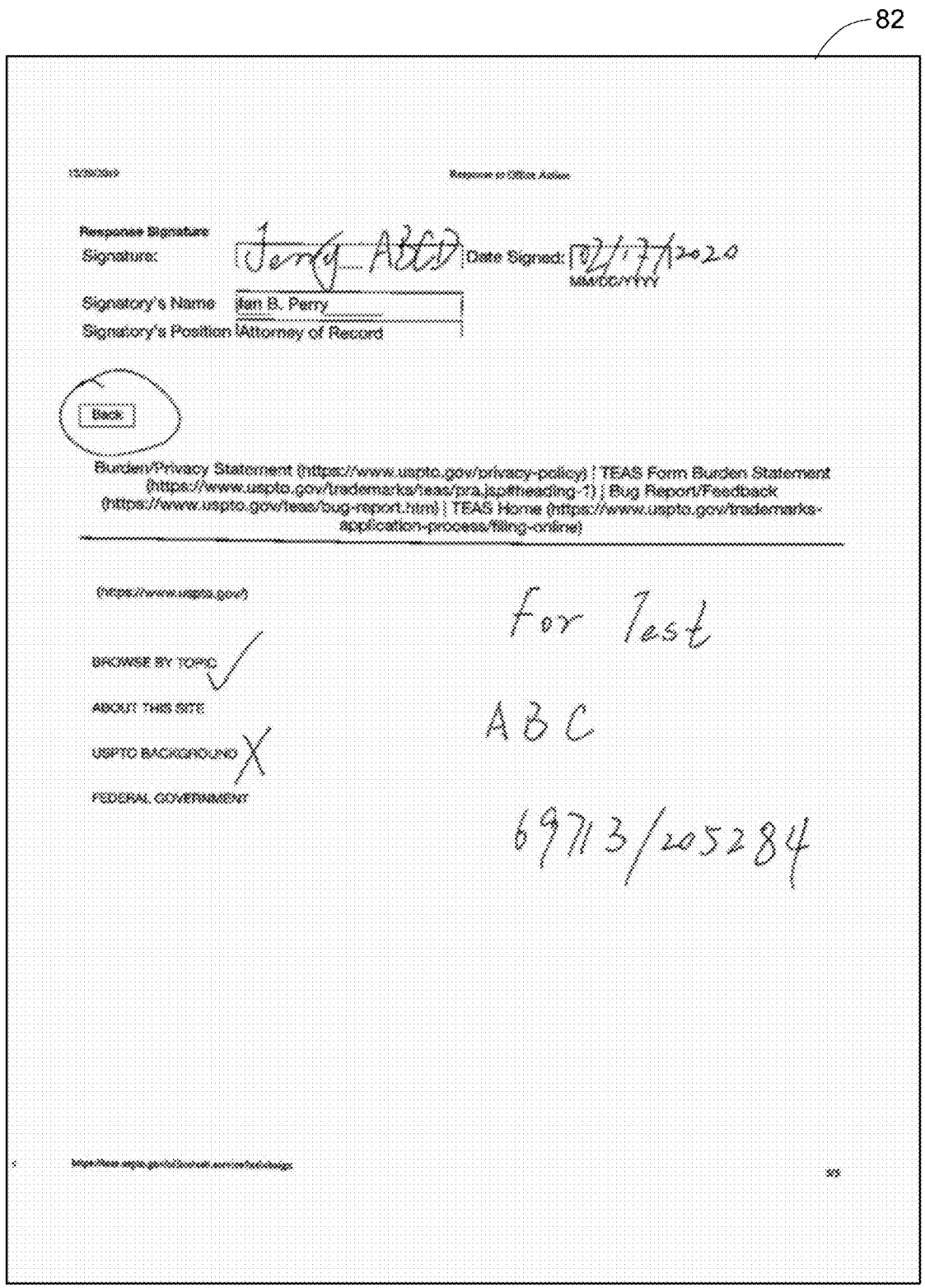
FIG. 9 is a schematic diagram of a blur image according to an embodiment of the disclosure.
Figure 10:
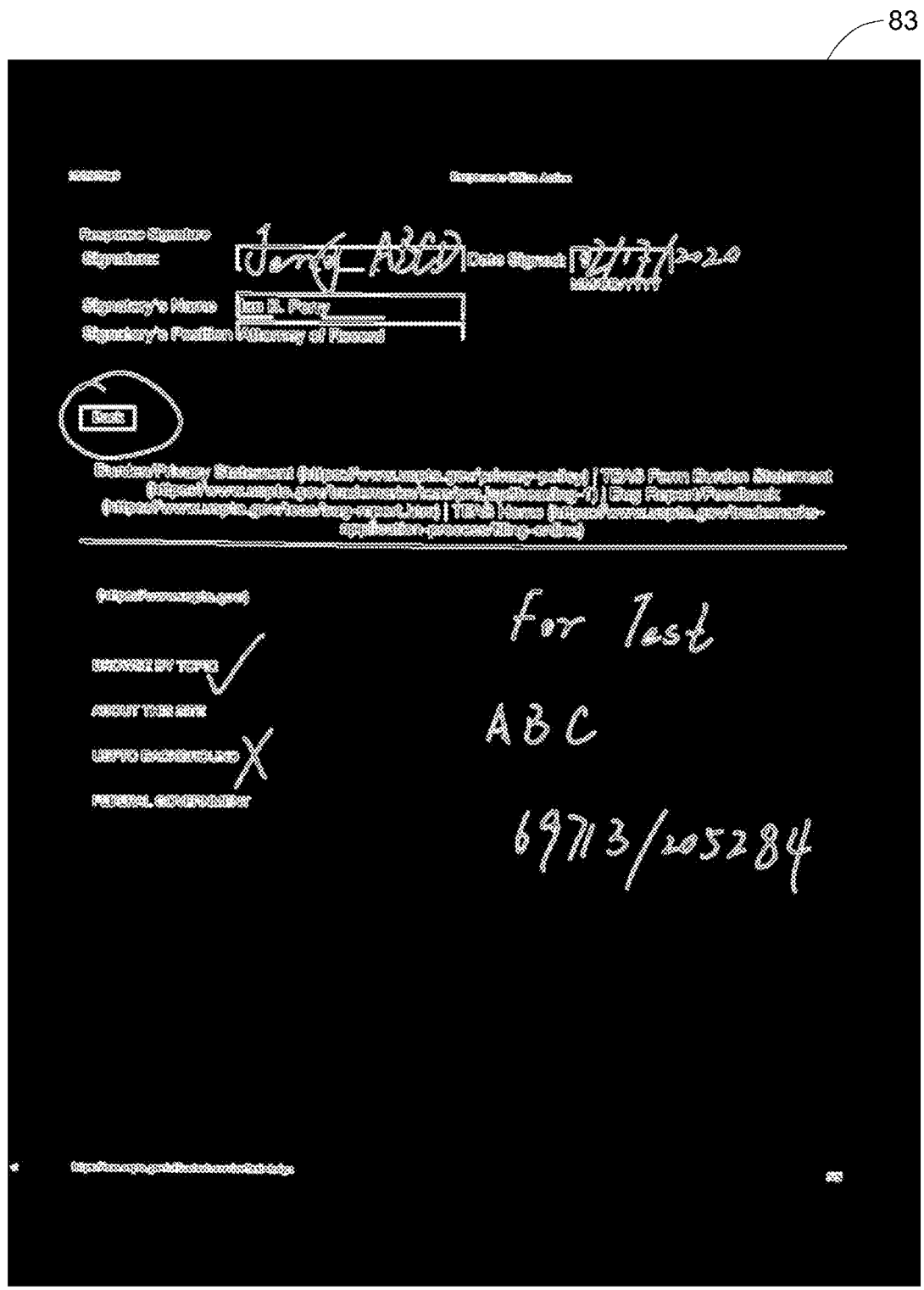
FIG. 10 is a pixel circumscribed contour image according to an embodiment of the disclosure.

FIG. 9 is a schematic diagram of a blur image according to an embodiment of the disclosure. FIG. 10 is a pixel circumscribed contour image according to an embodiment of the disclosure.

Next, as shown in FIG. 1, in Step S150, the first binary image is processed to obtain the pixel circumscribed contour image.

For example, the pixel circumscribed contour image 83 shown in FIG. 10 is the pixel circumscribed contour image obtained after processing the first binary image 81 shown in FIG. 8.

For example, as shown in FIG. 10, the pixel circumscribed contour image 83 includes multiple circumscribed contour pixels. White pixels in the pixel circumscribed contour image 83 indicate the circumscribed contour pixels. Pixels in a region surrounded by the circumscribed contour pixels are pixels corresponding to at least a part of at least one object. Black pixels inside the white pixels in the pixel circumscribed contour image 83 indicate pixels of the object.

For example, in some embodiments, Step S150 includes performing blurring processing on the first binary image to obtain the blur image; and performing XOR processing on the blur image and the first binary image to obtain the pixel circumscribed contour image.

For example, the blur image 82 shown in FIG. 9 may be the blur image obtained after performing blurring processing on the first binary image 81 shown in FIG. 8. As shown in FIG. 8 and FIG. 9, after performing blurring processing on the first binary image 81, a mask region of the object in the first binary image becomes larger.

For example, in some embodiments, Gaussian filtering may be adopted to perform blurring processing on the first binary image. It should be noted that in the disclosure, the method of blurring processing is not limited to Gaussian filtering and may also be other suitable methods, such as median filtering and mean filtering.

For example, the white pixels in the pixel circumscribed contour image 83 indicate different pixels between the blur image and the first binary image. In other words, for any white pixel in the pixel circumscribed contour image 83, a grayscale value of a pixel at a position corresponding to the white pixel in the blur image is different from a grayscale value of a pixel at a position corresponding to the white pixel in the first binary image. The black pixels in the pixel circumscribed contour image 83 indicate the same pixels between the blur image and the first binary image. In other words, for any black pixel in the pixel circumscribed contour image 83, a grayscale value of a pixel at a position corresponding to the black pixel in the blur image is the same as a grayscale value of a pixel at a position corresponding to the black pixel in the first binary image.

Figure 11:
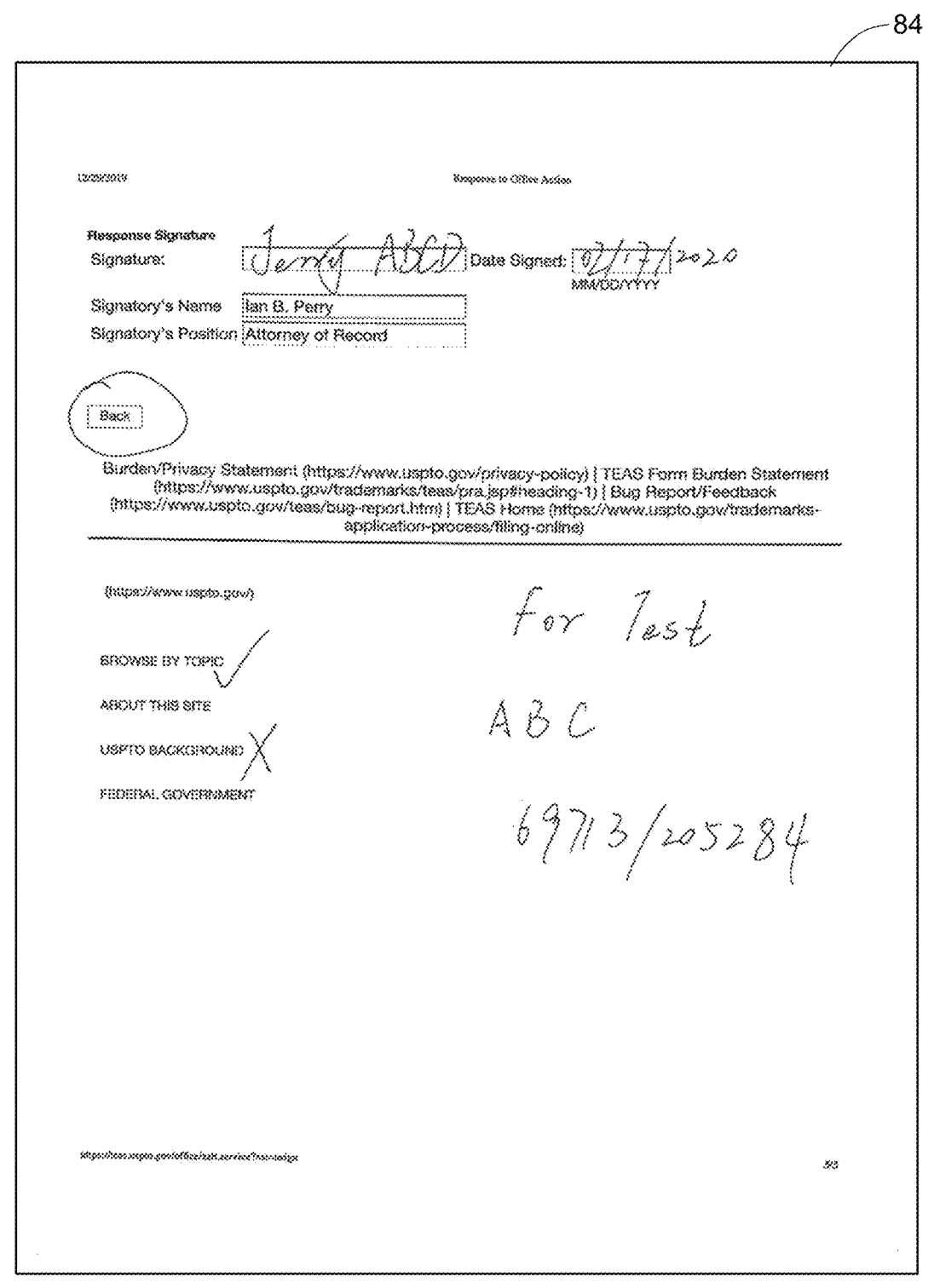

FIG. 11 is a schematic diagram of a second binary image according to an embodiment of the disclosure.

Next, as shown in FIG. 1, in Step S160, the original image is processed through a second binarization model to obtain the second binary image.

For example, the second binary image 84 shown in FIG. 11 is the image obtained after processing the original image 21 shown in FIG. 2 through the second binarization model.

For example, in Step S160, processing performed by the second binarization model (for example, less ink processing) is based on the original image. For example, processing performed by the second binarization model may be used to remove a part of the grayscale pixels in the original image while enhancing detail information of the object (for example, the character), that is, preserving more detailed pixel features. Processing performed by the second binarization model may also remove image noise interference in the original image, so that details of the object are more prominent.

For example, in some embodiments, Step S160 may include performing grayscale processing on the original image to obtain a grayscale image; processing the grayscale image according to a first threshold to obtain an intermediate binary image; performing guiding filtering processing on the grayscale image by using the intermediate binary image as a guiding image to obtain a filter image; determining a high-value pixel in the filter image according to the second threshold, wherein a grayscale value of the high-value pixel is greater than the second threshold; performing expanding processing on the grayscale value of the high-value pixel according to a preset expansion coefficient to obtain an expansion image; performing sharpening processing on the expansion image to obtain a clear image; and adjusting a contrast of the clear image to obtain the second binary image.

For example, the method of grayscale processing includes a component method, a maximum value method, an average value method, a weighted average method, etc.

For example, a threshold method may be adopted to perform binarization processing on the grayscale image to obtain the intermediate binary image. For example, a conventional selection method of a binarization threshold includes a bimodal method, a P-parameter method, a big law method (Otsu's method), a maximum entropy method, an iterative method, etc. A selection method of a first threshold may adopt any one of the methods. The first threshold may be set according to actual situations, which are not specifically limited here.

For example, the intermediate binary image is used as the guiding image in guiding filtering processing, the grayscale image is used as an input image in guiding filtering processing, and the filter image is used as an output image in guiding filtering processing. As such, by performing guiding filtering processing on the grayscale image through the intermediate binary image, the filter image substantially similar to the grayscale image and with edge texture similar to the intermediate binary image may be output. After guiding filtering processing, noise in the image is significantly reduced.

For example, the second threshold is a sum of a grayscale mean and standard deviations of grayscale values of the filter image, that is, the second threshold is equal to an average value of the grayscale value of each pixel in the filter image plus the standard deviation of the grayscale value of each pixel in the filter image.

For example, in some embodiments, the preset expansion coefficient is 1.2 to 1.5, for example, 1.3. The grayscale value of each high-value pixel is multiplied by the preset expansion coefficient to perform expanding processing on the grayscale value of the high-value pixel, thereby obtaining the expansion image with more obvious black and white contrast.

For example, in Step S160, in some embodiments, performing sharpening processing on the expansion image to obtain the clear image includes performing blurring processing on the expansion image by adopting Gaussian filtering to obtain the blur image corresponding to the expansion image; and mixing the blur image corresponding to the expansion image and the expansion image in proportion according to a preset mixing coefficient to obtain the clear image. Through performing sharpening processing on the expansion image, the clear image clearer than the expansion image may be obtained.

For example, in Step S160, adjusting the contrast of the clear image includes adjusting the grayscale value of each pixel of the clear image according to the grayscale mean of the clear image. Therefore, through adjusting the contrast of the clear image, the second binary image with more obvious black and white contrast may be obtained.

Figure 12:
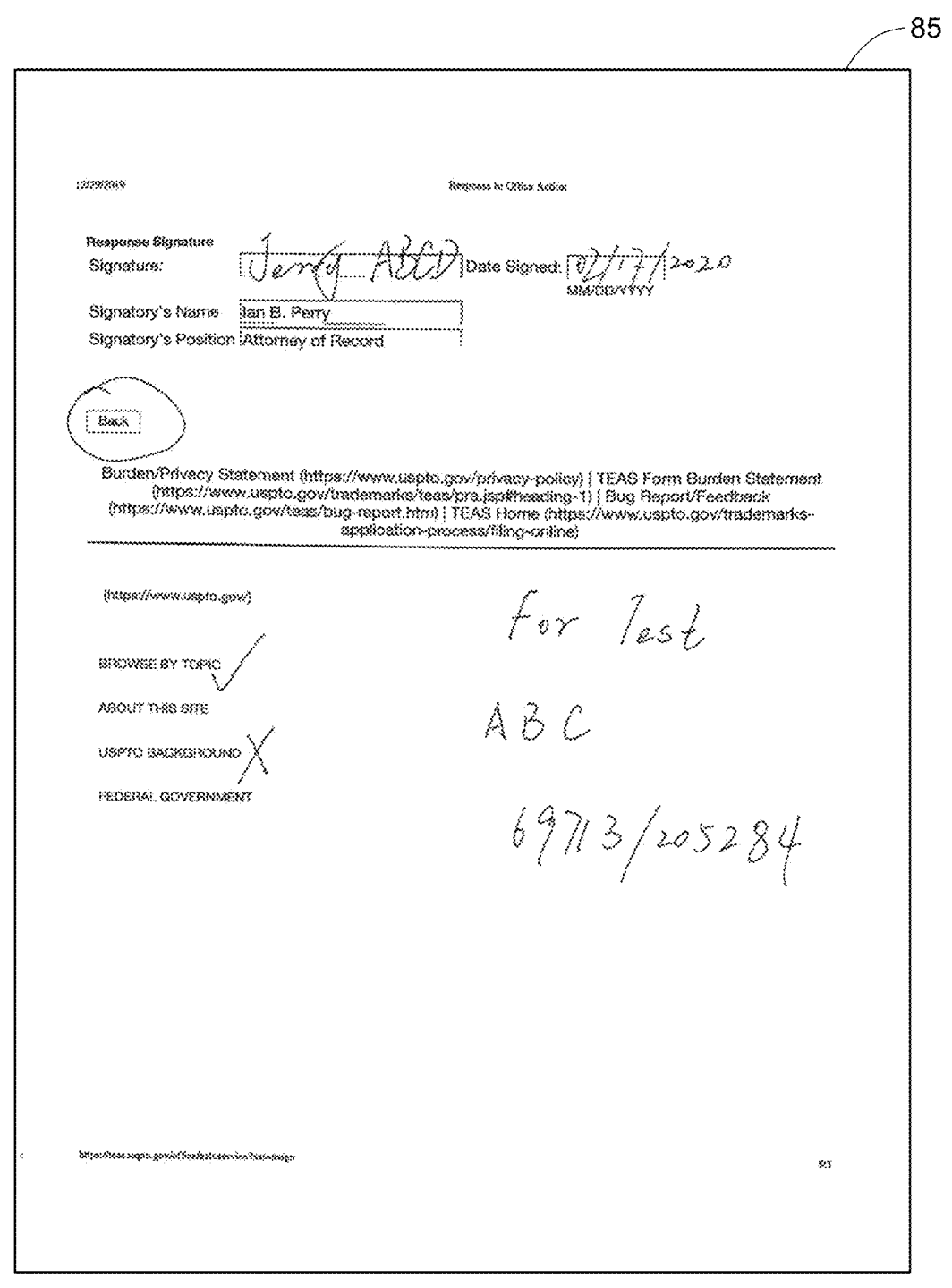

FIG. 12 is a schematic diagram of a synthetic image according to an embodiment of the disclosure. For example, FIG. 12 is an image of synthesizing of the first binary image 81 shown in FIG. 8 and the second binary image 84 shown in FIG. 11. For example, as shown in FIG. 12, the synthetic image 85 is a binary image.

Finally, as shown in FIG. 1, in Step S170, the second binary image and the first binary image are synthesized according to positions of the circumscribed contour pixels in the pixel circumscribed contour image to obtain the synthetic image.

It should be noted that "synthesizing the second binary image and the first binary image to obtain the synthetic image" indicates replacing grayscale values of pixels in the first binary image corresponding to the positions of the circumscribed contour pixels with grayscale values of pixels in the second binary image corresponding to the positions of the circumscribed contour pixels, that is, replacing all pixels in the first binary image corresponding to the positions of the circumscribed contour pixels with pixels with better effects.

For example, in some embodiments, Step S170 includes obtaining the positions of the circumscribed contour pixels in the pixel circumscribed contour image; extracting multiple target second binary pixels at positions in the second binary image corresponding to the positions of the circumscribed contour pixels; and respectively synthesizing the target second binary pixels in the second binary image to same positions in the first binary image according to a pixel correspondence between the second binary image and the first binary image to obtain the synthetic image of the original image.

Figure 13A:
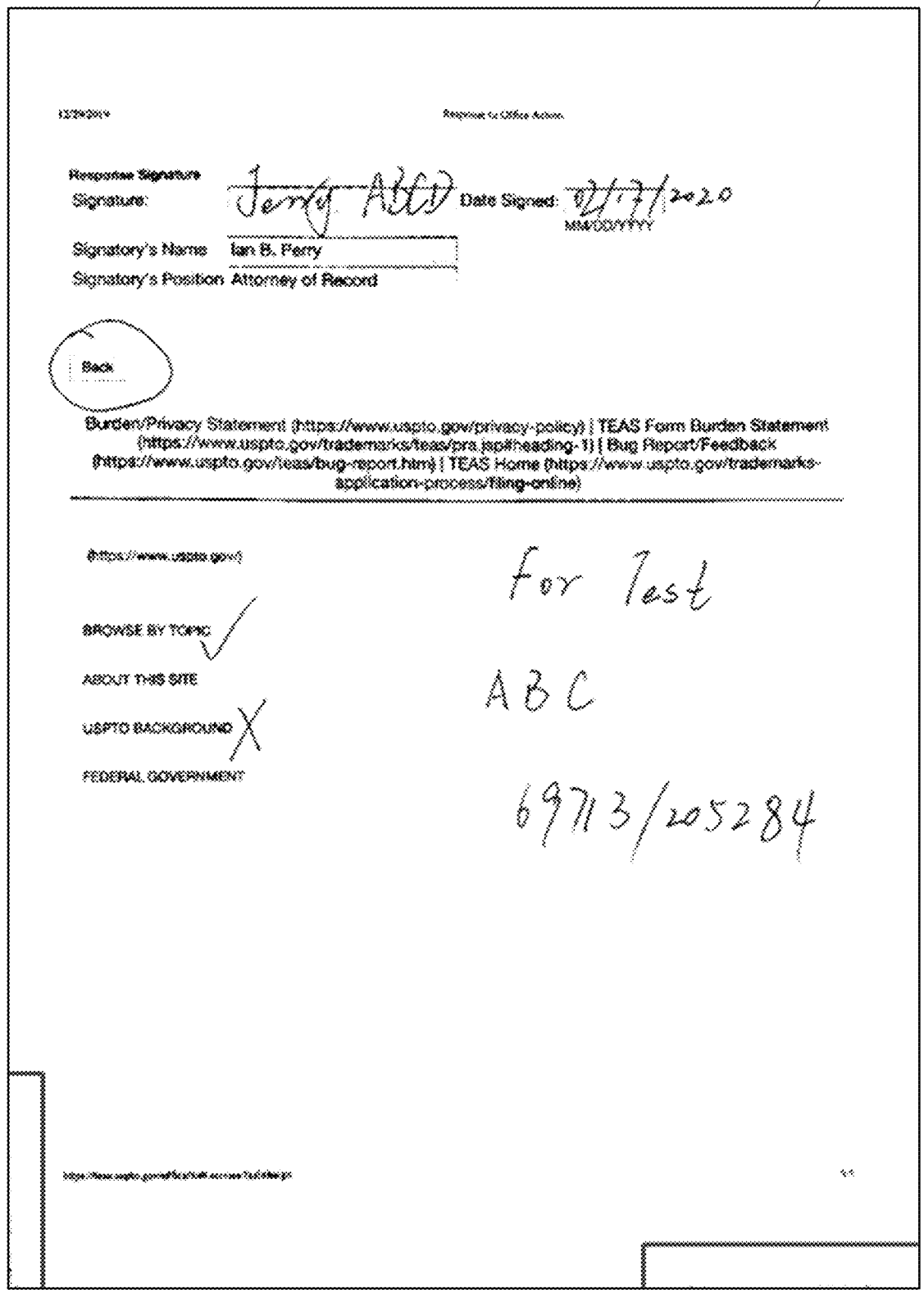
FIG. 13a is a synthetic image with black edges according to an embodiment of the disclosure.
Figure 13B:
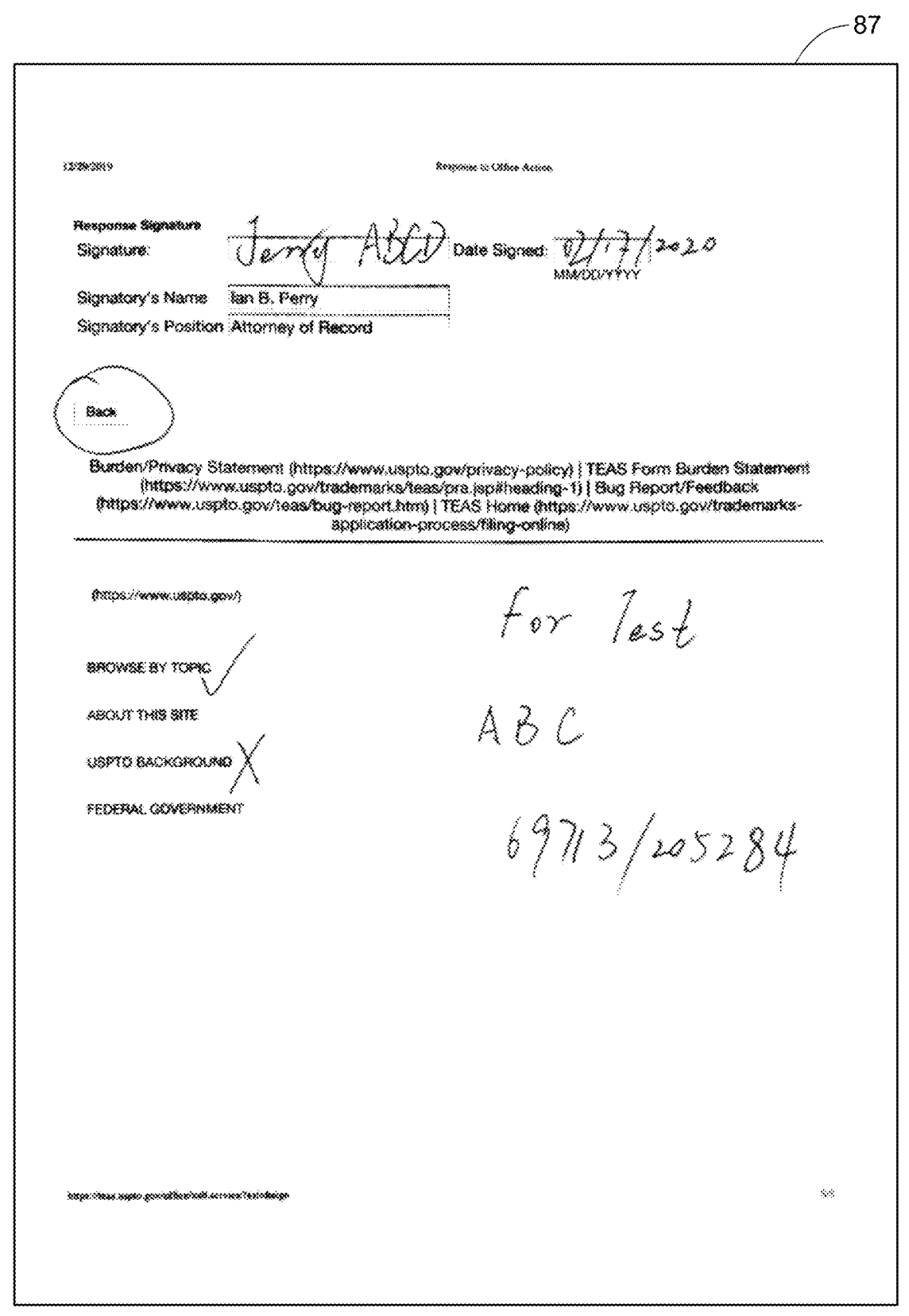

FIG. 13a is a synthetic image 86 with black edges according to an embodiment of the disclosure. FIG. 13b is a synthetic image 87 with black edges removed according to an embodiment of the disclosure.

As shown in FIG. 13a, there are black regions generated during the process of image processing in the black borders at the lower left corner and the lower right corner of the synthetic image 86, that is, parts indicated by black pixels in the black borders.

Since black edges generated during the process of image processing affects image quality and aesthetics, black edge removal processing needs to be performed on the synthetic image with black edges. For example, in an example, the image processing method further includes performing black edge removal processing on the synthetic image, that is, performing clearing processing on the black regions in the edge regions of the synthetic image, that is, changing grayscale values of pixels of the black regions in the edge regions of the synthetic image to grayscale values of background pixels. It is worth noting that in the embodiments of the disclosure, if the background pixel is a black pixel, that is, the grayscale value of the background pixel is 0, at this time, performing black edge removal processing on the synthetic image indicates changing a grayscale value of each white pixel in a region composed of white pixels whose size exceeds a preset threshold in the edge region to 0, that is, a preset grayscale value is 0 at this time.

For example, performing black edge removal processing on the synthetic image includes determining the edge region of the synthetic image; traversing the edge region of the synthetic image to judge whether there is a black region whose size exceeds the preset threshold; and in response to the edge region including at least one black region whose size exceeds the preset threshold, setting a grayscale value of a pixel corresponding to the at least one black region to the preset grayscale value.

For example, determining the edge region of the synthetic image may include identifying an image content region of the synthetic image, and using a part of the synthetic image excluding the image content region as the edge region. For example, determining the edge region of the synthetic image may include identifying the image content region of the synthetic image, and extending outward by a first preset size with the image content region as a center to obtain an extension image region; using a part of the synthetic image excluding the extension image region as the edge region. For example, determining the edge region of the synthetic image may include using a partial region extending from an edge of the synthetic image to a center of the synthetic image by a second preset size as the edge region. It should be noted that the size, determination method, etc. of the edge region are not limited by the disclosure.

For example, the edge region is traversed. If there are continuous black pixels, and the number of continuous black pixels exceeds a preset threshold (for example, the preset threshold may be 2 pixels), the continuous black pixels are the black region that needs to be removed. Then, a grayscale value of each pixel in the black region is set to the preset grayscale value. The preset grayscale value may be the grayscale value of the background pixel. For example, in some examples, the background pixel may be a white pixel. At this time, the preset grayscale value is 255.

For example, in an example, the top, bottom, left, and right edges of the synthetic image are respectively traversed. For example, row scanning and column scanning are started from the four edges of the synthetic image to judge whether there are continuous black pixels, and the number of black pixels exceeds the preset threshold. For example, a scan line function is adopted to start traversing from the edge of the synthetic image row by row and column by column. When a black pixel is scanned, recording starts, and the black pixel is used as a starting point of the black region. When a grayscale value of a pixel in the next row (or the next column) adjacent to the black pixel is 0, the pixel adjacent to the black pixel is used as a part of the black region. Then, scanning continues. When a grayscale value of a pixel in the next row (or the next column) adjacent to the black region is not 0, a boundary of the black region has been traversed, and scanning stops. Whether the size of the black region exceeds the preset threshold is judged. If the size of the black region exceeds the preset threshold, a grayscale value of each pixel in the black region is set to the preset grayscale value. If the size of the black region does not exceed the preset threshold, the grayscale value of each pixel in the black region remains unchanged.

In the embodiment, the image is traversed in a manner of row scanning and column scanning without pre-defining the edge region, so the implementation manner thereof is simpler and easier to operate.

It should be noted that the synthetic image in the embodiment may be a synthetic image obtained after being processed according to the embodiment or may be another binary target image, which is not limited by the disclosure.

It should be noted that in the disclosure, the pixels in the second binary image are referred to as the second binary pixels, the pixels in the first binary image are referred to as the first binary pixels, and the pixels in the synthetic image are referred to as synthetic pixels. The "second binary pixels", "first binary pixels", "synthetic pixels", etc. are only used to distinguish pixels located in different images and do not indicate that the structures, properties, etc. of the pixels are different.

Figure 14:
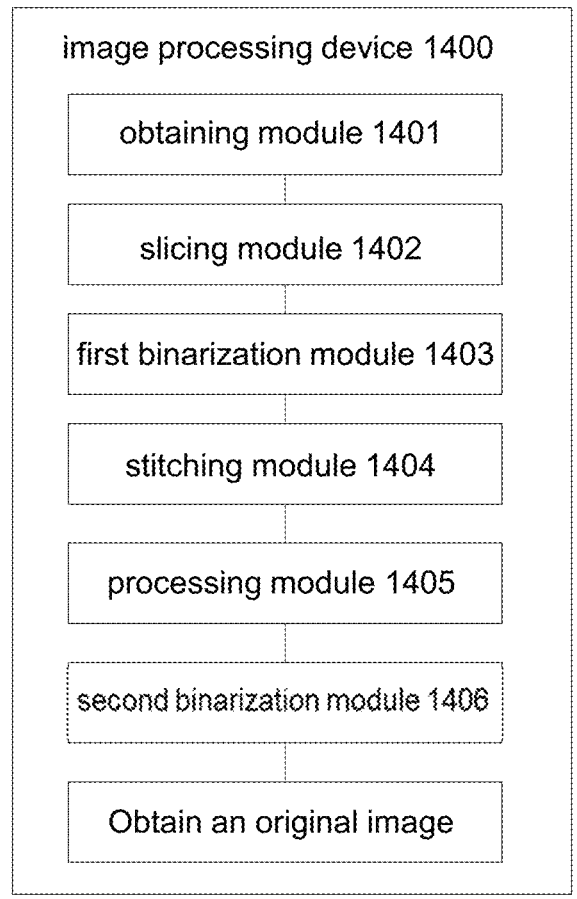
FIG. 14 is a schematic block diagram of an image processing device according to at least one embodiment of the disclosure.

Corresponding to the image processing method, at least one embodiment of the disclosure further provides an image processing device. FIG. 14 is a schematic block diagram of an image processing device according to at least one embodiment of the disclosure.

For example, as shown in FIG. 14, an image processing device 1400 includes an obtaining module 1401, a slicing module 1402, a first binarization module 1403, a stitching module 1404, a processing module 1405, a second binarization module 1406, and a synthesis module 1407.

The obtaining module 1401 is configured to obtain an original image. For example, the original image includes at least one object.

The slicing module 1402 is configured to perform slicing processing on the original image to obtain multiple slice images of the original image.

The first binarization module 1403 is configured to respectively process the slice images through a first binarization model to obtain multiple slice binary images respectively corresponding to the slice images.

The stitching module 1404 is configured to perform stitching processing on the slice binary images to obtain a first binary image.

The processing module 1405 is configured to process the first binary image to obtain a pixel circumscribed contour image. For example, the pixel circumscribed contour image includes multiple circumscribed contour pixels. Pixels in a region surrounded by the circumscribed contour pixels are pixels corresponding to at least a part of the at least one object.

The second binarization module 1406 is configured to process the original image through a second binarization model to obtain a second binary image.

The synthesis module 1407 is configured to synthesize the second binary image and the first binary image according to positions of the circumscribed contour pixels in the pixel circumscribed contour image to obtain a synthetic image. For example, the synthetic image is a binary image.

For example, the obtaining module 1401, the slicing module 1402, the first binarization module 1403, the stitching module 1404, the processing module 1405, the second binarization module 1406, and/or the synthesis module 1407 include codes and programs stored in a memory. A processor may execute the codes and the programs to implement some or all of the functions of the obtaining module 1401, the slicing module 1402, the first binarization module 1403, the stitching module 1404, the processing module 1405, the second binarization module 1406, and/or the synthesis module 1407. For example, the obtaining module 1401, the slicing module 1402, the first binarization module 1403, the stitching module 1404, the processing module 1405, the second binarization module 1406, and/or the synthesis module 1407 may be special-purpose hardware devices to implement some or all of the functions of the obtaining module 1401, the slicing module 1402, the first binarization module 1403, the combined module 1404, the processing module 1405, the second binarization module 1406, and/or the synthesis module 1407. For example, the obtaining module 1401, the slicing module 1402, the first binarization module 1403, the stitching module 1404, the processing module 1405, the second binarization module 1406, and/or the synthesis module 1407 may be one circuit board or a combination of multiple circuit boards to implement the functions. In the embodiment of the disclosure, the one circuit board or the combination of the circuit boards may include (1) one or more processors; (2) one or more non-transitory memories connected to the processors; and (3) firmware stored in the memories executable by the processors.

It should be noted that the obtaining module 1401 is configured to implement Step S110 shown in FIG. 1, the slicing module 1402 is configured to implement Step S120 shown in FIG. 1, the first binarization module 1403 is configured to implement Step S130 shown in FIG. 1, the stitching module 1404 is configured to implement Step S140 shown in FIG. 1, the processing module 1405 is configured to implement Step S150 shown in FIG. 1, the second binarization module 1406 is configured to implement Step S160 shown in FIG. 1, and the synthesis module 1407 is configured to implement Step S170 shown in FIG. 1. Therefore, for the specific description of the obtaining module 1401, reference may be made to the related description of Step S110 shown in FIG. 1 in the embodiment of the image processing method; for the specific description of the slicing module 1402, reference may be made to the related description of Step S120 shown in FIG. 1 in the embodiment of the image processing method; for the specific description of the first binarization module 1403, reference may be made to the related description of Step S130 shown in FIG. 1 in the embodiment of the image processing method; for the specific description of the stitching module 1404, reference may be made to the related description of Step S140 shown in FIG. 1 in the embodiment of the image processing method; for the specific description of the processing module 1405, reference may be made to the related description of Step S150 shown in FIG. 1 in the embodiment of the image processing method; for the specific description of the second binarization module 1406, reference may be made to the related description of Step S160 shown in FIG. 1 in the embodiment of the image processing method; and for the specific description of the synthesis module 1407, reference may be made to the related description of Step S170 shown in FIG. 1 in the embodiment of the image processing method. In addition, the image processing device may implement technical effects similar to the image processing method, which will not be repeated here.

Figure 15:
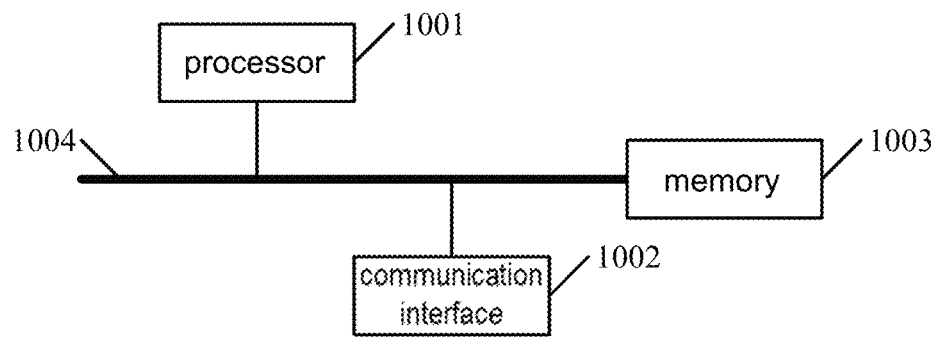
FIG. 15 is a schematic block diagram of an electronic apparatus according to at least one embodiment of the disclosure.

At least one embodiment of the disclosure further provides an electronic apparatus. FIG. 15 is a schematic block diagram of an electronic apparatus according to at least one embodiment of the disclosure.

For example, as shown in FIG. 15, the electronic apparatus includes a processor 1001, a communication interface 1002, a memory 1003, and a communication bus 1004. The processor 1001, the communication interface 1002, and the memory 1003 implement mutual communicate through the communication bus 1004. Components such as the processor 1001, the communication interface 1002, and the memory 1003 may also communicate through a network connection. The disclosure does not limit the type and functions of the network.

For example, the memory 1003 is configured to non-transitorily store a computer-readable instruction. The processor 1001 is configured to run the computer-readable instruction.

When the computer-readable instruction is run by the processor 1001, the image processing method according to any embodiment of the disclosure is implemented. For the specific implementation of each step of the image processing method and related explanation content, reference may be made to the embodiment of the image processing method, which will not be repeated here.

For example, the processor 1001 executes a program stored in the memory 1003 to implement the implementation manner of the image processing method, which is the same as the implementation manner mentioned in the embodiment part of the image processing method and will not be repeated here.

For example, the communication bus 1004 may be a peripheral component interconnect (PCI) bus, an enhanced industry standard architecture (EISA) bus, etc. The communication bus may be divided into an address bus, a data bus, a control bus, etc. For ease of indication, the same is indicated by only one thick line in the drawing, but it does not indicate that there is only one bus or one type of bus.

For example, the communication interface 1002 is configured to implement communication between the electronic apparatus and other apparatuses.

For example, the processor 1001 and memory 1003 can be disposed on the server side (or the cloud).

For example, the processor 1001 may control other components in the electronic apparatus to execute desired functions. The processor 1001 may be a central processing unit (CPU), a network processor (NP), etc.; and may also be a digital signal processor (DSP), an application specific integrated circuit (ASIC), a field programmable gate array (FPGA), or other programmable logic devices, discrete gate or transistor logic devices, and discrete hardware components. The CPU may be X86, advanced RISC machine (ARM) architecture, etc.

For example, the memory 1003 may include any combination of one or more computer program products. The computer program product may include various forms of computer-readable storage mediums, such as volatile memories and/or non-volatile memories. The volatile memory may, for example, include a random access memory (RAM) and/or a cache. The non-volatile memory may, for example, include a read-only memory (ROM), a hard disk, an erasable programmable read-only memory (EPROM), a compact disk read-only memory (CD-ROM), a universal serial bus (USB) memory, a flash memory, etc. One or more computer-readable instructions may be stored in the computer-readable storage medium. The processor 1001 may run the computer-readable instructions to implement various functions of the electronic apparatus. Various applications and various data may also be stored in the storage medium.

For example, for detailed description of the process of performing image processing by the electronic apparatus, reference may be made to the relevant description in the embodiment of the image processing method, which will not be repeated.

Figure 16:
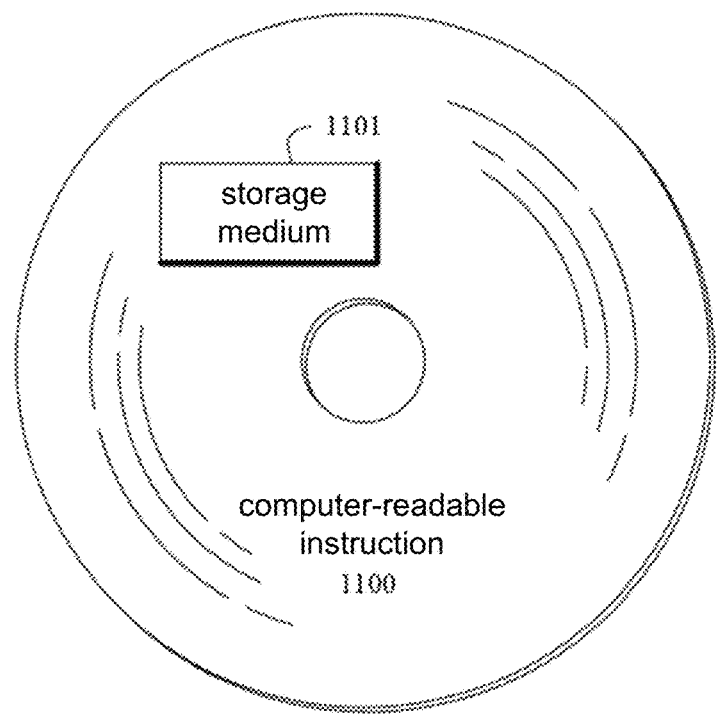
FIG. 16 is a schematic diagram of a non-transitory computer-readable storage medium according to at least one embodiment of the disclosure.

FIG. 16 is a schematic diagram of a non-transitory computer-readable storage medium according to at least one embodiment of the disclosure. For example, as shown in FIG. 16, one or more computer-readable instructions 1101 may be non-transitorily stored in a storage medium 1100. For example, when the computer-readable instruction 1101 is executed by the processor, one or more steps in the image processing method according to the above may be executed.

For example, the storage medium 1100 may be applied to the electronic apparatus and/or the image processing device 1400. For example, the storage medium 1100 may include the memory 1003 in the electronic apparatus.

For example, for the description of the storage medium 1100, reference may be made to the description of the memory in the embodiment of the electronic apparatus, which will not be repeated.

Figure 17:
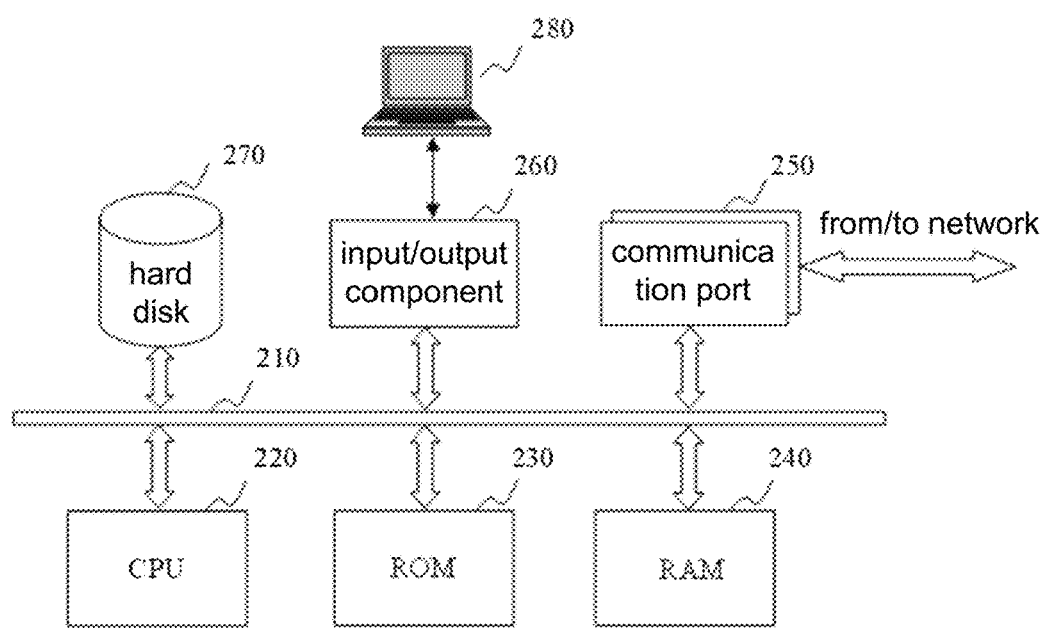
FIG. 17 is a schematic diagram of a hardware environment according to at least one embodiment of the disclosure.

FIG. 17 is a schematic diagram of a hardware environment according to at least one embodiment of the disclosure. The electronic apparatus according to the disclosure may be applied to an Internet system.

The computer system provided in FIG. 17 may be used to implement the functions of the image processing device and/or the electronic apparatus in the disclosure. Such computer systems may include personal computers, laptops, tablet computers, mobile phones, personal digital assistants, smart glasses, smart watches, smart rings, smart helmets, and any smart portable apparatuses or wearable apparatuses. The specific system in the embodiment uses a functional block diagram to explain a hardware platform containing a user interface. Such computer apparatus may be a general-purpose computer apparatus or a special-purpose computer apparatus. Both computer apparatuses may be used to implement the image processing device and/or the electronic apparatus in the embodiment. The computer system may include any component implementing currently described information required to implement image processing. For example, the computer system can be implemented by the computer apparatus through a hardware apparatus, a software program, firmware, and a combination thereof of the computer apparatus. For convenience, only one computer apparatus is shown in FIG. 17, but the computer functions related to the information required for image processing according to the embodiment may be implemented by a set of similar platforms in a distributed manner to disperse the processing load of the computer system.

As shown in FIG. 17, the computer system may include a communication port 250 connected to a network implementing data communication. For example, the computer system may send and receive information and data through the communication port 250, that is, the communication port 250 may implement wireless or wired communication between the computer system and other electronic apparatuses to exchange data. The computer system may also include a processor set 220 (that is, the processor described above) for executing program instructions. The processor set 220 may be composed of at least one processor (for example, a CPU). The computer system may include an internal communication bus 210. The computer system may include different forms of program storage units and data storage units (that is, the memory or the storage medium described above), such as a hard disk 270, a read-only memory (ROM) 230, and a random access memory (RAM) 240, which can be configured to store various data files used for computer processing and/or communication and possible program instructions executed by the processor set 220. The computer system may further include an input/output component 260. The input/output component 260 is configured to implement input/output data flow between the computer system and other components (for example, a user interface 280, etc.).

Generally, the following devices may be connected to the input/output component 260: an input device such as a touch screen, a touch pad, a keyboard, a mouse, a camera, a microphone, an accelerometer, and a gyroscope; an output device such as a liquid crystal display (LCD), a speaker, and a vibrator; a storage device such as a tape and a hard disk; and a communication interface.

Although FIG. 17 shows a computer system with various devices, it should be understood that the computer system is not required to have all the devices shown. Alternatively, the computer system may have more or fewer devices.

For the disclosure, the following points need to be explained:

(1) The drawings of the embodiments of the disclosure only refer to the structures related to the embodiments of the disclosure. For other structures, reference may be made to conventional designs.

(2) For clarity, in the drawings for describing the embodiments of the disclosure, the thickness and the size of layers or structures are exaggerated. It will be understood that when an element such as a layer, a film, a region, or a substrate is referred to as being "on" or "under" another element, the element may be "directly" on or "under" another element or there may be an intermediate element therebetween.

(3) In the case of no conflict, the embodiments of the disclosure and the features in the embodiments may be combined with one other to obtain new embodiments.

The above are only specific implementation manners of the disclosure, but the protection scope of the disclosure is not limited thereto. The protection scope of the disclosure shall be defined by the protection scope of the claims.

What is claimed is:

1. An image processing method, comprising:
obtaining an original image, wherein the original image comprises at least one object;
performing a slicing processing on the original image to obtain a plurality of slice images of the original image;
respectively processing the slice images through a first binarization model to obtain a plurality of slice binary images respectively corresponding to the slice images;
performing a stitching processing on the slice binary images to obtain a first binary image;
processing the first binary image to obtain a pixel circumscribed contour image, wherein the pixel circumscribed contour image comprises a plurality of circumscribed contour pixels, and pixels in a region surrounded by the circumscribed contour pixels are pixels corresponding to at least a part of the at least one object;
processing the original image through a second binarization model to obtain a second binary image; and
synthesizing the second binary image and the first binary image according to positions of the circumscribed contour pixels in the pixel circumscribed contour image to obtain a synthetic image, wherein the synthetic image is a binary image.

2. The image processing method according to claim 1, wherein performing the slicing processing on the original image to obtain the slice images of the original image comprises:
determining a first slice size and an extension slice size;
determining a second slice size according to the first slice size and the extension slice size;
determining a number of slices according to a size of the original image and the second slice size; and
performing the slicing processing on the original image according to the extension slice size, the second slice size, and the number of slices to obtain the slice images of the original image, wherein
a number of slice images is equal to the number of slices, and a size of each slice image in the slice images is the first slice size.

3. The image processing method according to claim 2, wherein performing the slicing processing on the original image according to the extension slice size, the second slice size, and the number of slices to obtain the slice images of the original image comprises:
determining an original image to be sliced based on the original image according to the second slice size and the number of slices; and
performing the slicing processing on the original image to be sliced based on the second slice size and the extension slice size to obtain the slice images.

4. The image processing method according to claim 3, wherein performing the slicing processing on the original image to be sliced based on the second slice size and the extension slice size to obtain the slice images comprises:
dividing the original image to be sliced into a plurality of subregions according to the second slice size, wherein a number of subregions is equal to the number of slices; and
performing the slicing processing on the original image to be sliced according to the extension slice size and the subregions to obtain the slice images, wherein the slice images correspond to the subregions one-to-one, and each slice image in the slice images comprises a corresponding subregion in the subregions.

5. The image processing method according to claim 4, wherein the original image comprises four fixed edges, each subregion in the subregions comprises four region edges, and performing the slicing processing on the original image to be sliced according to the extension slice size and the subregions to obtain the slice images comprises:

in response to all four region edges corresponding to an i-th subregion in the subregions not overlapping with the four fixed edges, respectively extending the four region edges corresponding to the i-th subregion by the extension slice size in a direction away from the i-th subregion with the i-th subregion as a center to obtain a slice position corresponding to a slice image corresponding to the i-th subregion, and slicing the original image to be sliced according to the slice position to obtain the slice image corresponding to the i-th subregion;

in response to one region edge in the four region edges corresponding to the i-th subregion in the subregions overlapping with one fixed edge in the four fixed edges, extending a region edge opposite to the one region edge in the four region edges by twice the extension slice size in the direction away from the i-th subregion, and respectively extending region edges adjacent to the one region edge in the four region edges by the extension slice size in the direction away from the i-th subregion to obtain the slice position corresponding to the slice image corresponding to the i-th subregion, and slicing the original image to be sliced according to the slice position to obtain the slice image corresponding to the i-th subregion; or in response to two region edges in the four region edges corresponding to the i-th subregion in the subregions overlapping with two fixed edges in the four fixed edges, extending other region edges other than the two region edges in the four region edges by twice the extension slice size in the direction away from the i-th subregion to obtain the slice position corresponding to the slice image corresponding to the i-th subregion, and slicing the original image to be sliced according to the slice position to obtain the slice image corresponding to the i-th subregion, where i is a positive integer and is less than or equal to the number of subregions.

6. The image processing method according to claim 4, wherein a size of each slice binary image in the slice binary images is the first slice size, and performing the stitching processing on the slice binary images to obtain the first binary image comprises:

determining a positional relationship of the slice binary images according to a positional relationship of the subregions in the original image to be sliced;

performing the stitching processing on the slice binary images based on the positional relationship of the slice binary images to obtain a binary prediction image; and in response to a size of the binary prediction image being not equal to the size of the original image, performing a size restoration processing on the binary prediction image to obtain the first binary image, and in response to the size of the binary prediction image being equal to the size of the original image, using the binary prediction image as the first binary image, wherein a size of the first binary image is the same as the size of the original image.

7. The image processing method according to claim 6, wherein all pixels in the first binary image are arranged in n rows and m columns, and performing the stitching processing on the slice binary images based on the positional relationship of the slice binary images to obtain the binary prediction image comprises:

performing the stitching processing on the slice binary images based on the positional relationship of the slice binary images to obtain an intermediate binary prediction image, wherein all pixels in the intermediate binary prediction images are arranged in n rows and m columns;

in response to a t1-th row and a t2-th column in the intermediate binary prediction image including only one pixel, using a grayscale value of the one pixel located in the t1-th row and the t2-th column as a grayscale value of a pixel in a t1-th row and a t2-th column in the binary prediction image; and in response to the t1-th row and the t2-th column in the intermediate binary prediction image including a plurality of pixels, performing an OR operation on grayscale values of the pixels located in the t1-th row and the t2-th column to obtain grayscale values of pixels in the t1-th row and the t2-th column in the binary prediction image, where n, m, t1, and t2 are all positive integers, t1 is less than or equal to n, and t2 is less than or equal to m.

8. The image processing method according to claim 1, wherein performing the slicing processing on the original image to obtain the slice images of the original image comprises:

determining a second slice size;

determining a number of slices according to a size of the original image and the second slice size; and performing the slicing processing on the original image according to the second slice size and the number of slices to obtain the slice images of the original image, wherein a number of slice images is equal to the number of slices, and a size of each slice image in the slice images is the second slice size.

9. The image processing method according to claim 8, wherein performing the slicing processing on the original image according to the second slice size and the number of slices to obtain the slice images of the original image comprises:

determining an original image to be sliced based on the original image according to the second slice size and the number of slices; and performing the slicing processing on the original image to be sliced based on the second slice size to obtain the slice images.

10. The image processing method according to claim 9, wherein a size of each slice binary image in the slice binary images is the second slice size, and performing the stitching processing on the slice binary images to obtain the first binary image comprises:

determining a positional relationship of the slice binary images according to a positional relationship of the slice images in the original image to be sliced;

performing the stitching processing on the slice binary images based on the positional relationship of the slice binary images to obtain a binary prediction image; and in response to a size of the binary prediction image being not equal to the size of the original image, performing a size restoration processing on the binary prediction image to obtain the first binary image, and in response to the size of the binary prediction image being equal to the size of the original image, using the binary prediction image as the first binary image, wherein a size of the first binary image is the same as the size of the original image.

11. The image processing method according to claim 3, wherein determining the original image to be sliced based on the original image according to the second slice size and the number of slices comprises:
  determining a size to be sliced according to the second slice size and the number of slices;
  in response to the size of the original image being the same as the size to be sliced, using the original image as the original image to be sliced; and
  in response to the size of the original image being different from the size to be sliced, adjusting the size of the original image to obtain the original image to be sliced, wherein a size of the original image to be sliced is the same as the size to be sliced.

12. The image processing method according to claim 2, wherein the number of slices L is obtained through a following equation:

$$L=\text{round}(m/p)\times\text{round}(n/q)$$

where the size of the original image is m×n, the second slice size is p×q, and round(*) indicates a rounding function.

13. The image processing method according to claim 1, wherein processing the first binary image to obtain the pixel circumscribed contour image comprises:
  performing a blurring processing on the first binary image to obtain a blur image; and
  performing a XOR processing on the blur image and the first binary image to obtain the pixel circumscribed contour image.

14. The image processing method according to claim 13, wherein synthesizing the second binary image and the first binary image according to the positions of the circumscribed contour pixels in the pixel circumscribed contour image to obtain the synthetic image comprises:
  obtaining the positions of the circumscribed contour pixels in the pixel circumscribed contour image;
  extracting a plurality of target second binary pixels at positions in the second binary image corresponding to the positions of the circumscribed contour pixels; and
  respectively synthesizing the target second binary pixels in the second binary image to same positions in the first binary image according to a pixel correspondence between the second binary image and the first binary image to obtain the synthetic image.

15. The image processing method according to claim 1, wherein processing the original image through the second binarization model to obtain the second binary image comprises:
  performing a grayscale processing on the original image to obtain a grayscale image;
  processing the grayscale image according to a first threshold to obtain an intermediate binary image;
  performing a guiding filtering processing on the grayscale image by using the intermediate binary image as a guiding image to obtain a filter image;
  determining a high-value pixel in the filter image according to a second threshold, wherein a grayscale value of the high-value pixel is greater than the second threshold;
  performing an expanding processing on the grayscale value of the high-value pixel according to a preset expansion coefficient to obtain an expansion image;
  performing a sharpening processing on the expansion image to obtain a clear image; and
  adjusting a contrast of the clear image to obtain the second binary image.

16. The image processing method according to claim 1, further comprising:
  performing a black edge removal processing on the synthetic image.

17. The image processing method according to claim 16, wherein performing the black edge removal processing on the synthetic image comprises:
  determining an edge region of the synthetic image;
  traversing the edge region of the synthetic image to judge whether there is a black region whose size exceeds a preset threshold; and
  in response to the edge region including at least one black region whose size exceeds the preset threshold, setting a grayscale value of a pixel corresponding to the at least one black region to a preset grayscale value.

18. An image processing device, comprising:
  an obtaining module, configured to obtain an original image, wherein the original image comprises at least one object;
  a slicing module, configured to perform a slicing processing on the original image to obtain a plurality of slice images of the original image;
  a first binarization module, configured to respectively process the slice images through a first binarization model to obtain a plurality of slice binary images respectively corresponding to the slice images;
  a stitching module, configured to perform a stitching processing on the slice binary images to obtain a first binary image;
  a processing module, configured to process the first binary image to obtain a pixel circumscribed contour image, wherein the pixel circumscribed contour image comprises a plurality of circumscribed contour pixels, and pixels in a region surrounded by the circumscribed contour pixels are pixels corresponding to at least a part of the at least one object;
  a second binarization module, configured to process the original image through a second binarization model to obtain a second binary image; and
  a synthesis module, configured to synthesize the second binary image and the first binary image according to positions of the circumscribed contour pixels in the pixel circumscribed contour image to obtain a synthetic image, wherein the synthetic image is a binary image.

19. An electronic apparatus, comprising:
  a memory, configured to non-transitorily store a computer-readable instruction; and
  a processor, configured to run the computer-readable instruction, and when the computer-readable instruction is run by the processor, the image processing method according to claim 1 is implemented.

20. A non-transitory computer-readable storage medium, storing a computer-readable instruction, wherein when the computer-readable instruction is executed by a processor, the image processing method according to claim 1 is implemented.

* * * * *